(12) United States Patent
Suzuki

(10) Patent No.: US 9,020,702 B2
(45) Date of Patent: Apr. 28, 2015

(54) STEERING CONTROL APPARATUS OF VEHICLE AND STEERING CONTROL METHOD OF THE SAME

(71) Applicant: Nissan Motor Co., Ltd., Kanagawa (JP)

(72) Inventor: Taku Suzuki, Isehara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 14/361,165

(22) PCT Filed: Oct. 19, 2012

(86) PCT No.: PCT/JP2012/006709
§ 371 (c)(1),
(2) Date: May 28, 2014

(87) PCT Pub. No.: WO2013/094097
PCT Pub. Date: Jun. 27, 2013

(65) Prior Publication Data
US 2014/0343791 A1 Nov. 20, 2014

(30) Foreign Application Priority Data

| Dec. 22, 2011 | (JP) | 2011-280818 |
| Dec. 22, 2011 | (JP) | 2011-280819 |
| Dec. 22, 2011 | (JP) | 2011-280820 |

(51) Int. Cl.
*B62D 5/04* (2006.01)
*B62D 15/02* (2006.01)

(52) U.S. Cl.
CPC ............ *B62D 5/046* (2013.01); *B62D 15/0235* (2013.01); *B62D 5/0487* (2013.01); *B62D 5/0469* (2013.01)

(58) Field of Classification Search
CPC .. B62D 5/046; B62D 5/0469; B62D 15/0235; B64D 5/0487
See application file for complete search history.

(56) References Cited

FOREIGN PATENT DOCUMENTS

| JP | 10-217988 A | 8/1998 |
| JP | 2008-285030 A | 11/2008 |
| JP | 2008-285041 A | 11/2008 |
| JP | 2009-190557 A | 8/2009 |

*Primary Examiner* — Thomas Tarcza
*Assistant Examiner* — Kevin Myhre
(74) *Attorney, Agent, or Firm* — Young Basile

(57) ABSTRACT

A steering control apparatus of a vehicle includes a steering motor configured to output a steering torque for steering turning wheel, a steering motor angle sensor configured to detect a rotation angle of the steering motor, a steering motor drive current supply unit configured to supply the steering motor with a steering motor drive current for setting a turning angle of the turning wheel to an angle corresponding to an operation of a steering wheel, a set rotation angle storage unit configured to store beforehand a set rotation angle which is the rotation angle of the steering motor and which corresponds to the set turning angle that is set to an angle smaller than a limit turning angle to which the turning wheel is steerable, and a current supply quantity limiting unit configured to limit a supply quantity of the steering motor drive current.

18 Claims, 7 Drawing Sheets

STEERING CONTROL APPARATUS OF VEHICLE AND STEERING CONTROL METHOD OF THE SAME

CROSS REFERENCE TO RELATED APPLICATION

The present application claims priority to Japanese Patent Application Nos. 2011-280818, filed Dec. 22, 2011; 2011-280819, filed Dec. 22, 2011; and 2011-280820, filed Dec. 22, 2011, each incorporated herein in its entirety.

TECHNICAL FIELD

The present invention relates to a steering control apparatus of a vehicle for steering turning wheels at an angle (i.e., target turning angle) in accordance with an operation of a steering wheel via a steering motor in a state where a torque transmission path between the steering wheel and the turning wheels is mechanically disconnected.

BACKGROUND

In the related art, a steering control apparatus is known for steering turning wheels at an angle (i.e., target turning angle) in accordance with an operation of a steering wheel via a steering motor in a state where a torque transmission path between the steering wheel and the turning wheels is mechanically disconnected. Such a steering control apparatus is a device constituting a generally called Steer By Wire (hereinafter, also referred to as "SBW") system (i.e., SBW system), and is described, for example, in JP H10-217988 A.

In the steering control apparatus described in JP H10-217988 A, when the turning wheels are continuously operated in a steering direction in a state where the turning wheels come in contact with a curbstone or the like, a drive current to be supplied to the steering motor is made to decrease so as to prevent the drive current from being supplied continuously to the steering motor.

SUMMARY

Even in full steering in which a rack end (an end of a rack shaft) comes into contact with a steering rack, it is considered that the drive current is continuously supplied to the steering motor when the steering wheel is continuously operated in the steering direction. However, in the steering control apparatus described in JP H10-217988 A, a countermeasure against the full steering is not mentioned at all.

The present invention has been made in view of the above-mentioned problem, and has an object to provide a steering control apparatus of a vehicle and a steering control method of the same which can suppress contact of the rack end with the steering rack and suppress supply of an excessive drive current to the steering motor.

Solution to Problem

In order to achieve the above-mentioned object, according to an aspect of the present invention, a set rotation angle is stored which is a rotation angle of a steering motor and which corresponds to a set turning angle that is set to an angle smaller than a steerable limit turning angle of the turning wheels. The rotation angle of the steering motor configured to output a steering torque for steering the turning wheels is detected and a supply quantity of a steering motor drive current to the steering motor is limited so that the detected rotation angle of the steering motor is not greater than the stored set rotation angle.

In addition, when it is determined that a predetermined permission condition is satisfied, a limit on the supply quantity of the steering motor drive current is released. When the turning wheels are steered up to a steerable limit turning angle in a state where the limit is released, the rotation angle of the steering motor is calculated. The set rotation angle is updated depending on a deviation between the calculated rotation angle of the steering motor and the set turning angle.

DESCRIPTION OF EMBODIMENTS

Hereinafter, embodiments of the present invention will be described with reference to the accompanying drawings.

A first embodiment (hereinafter, referred to as "this embodiment") of the present invention will be described below with reference to the accompanying drawings.

Figure 1:
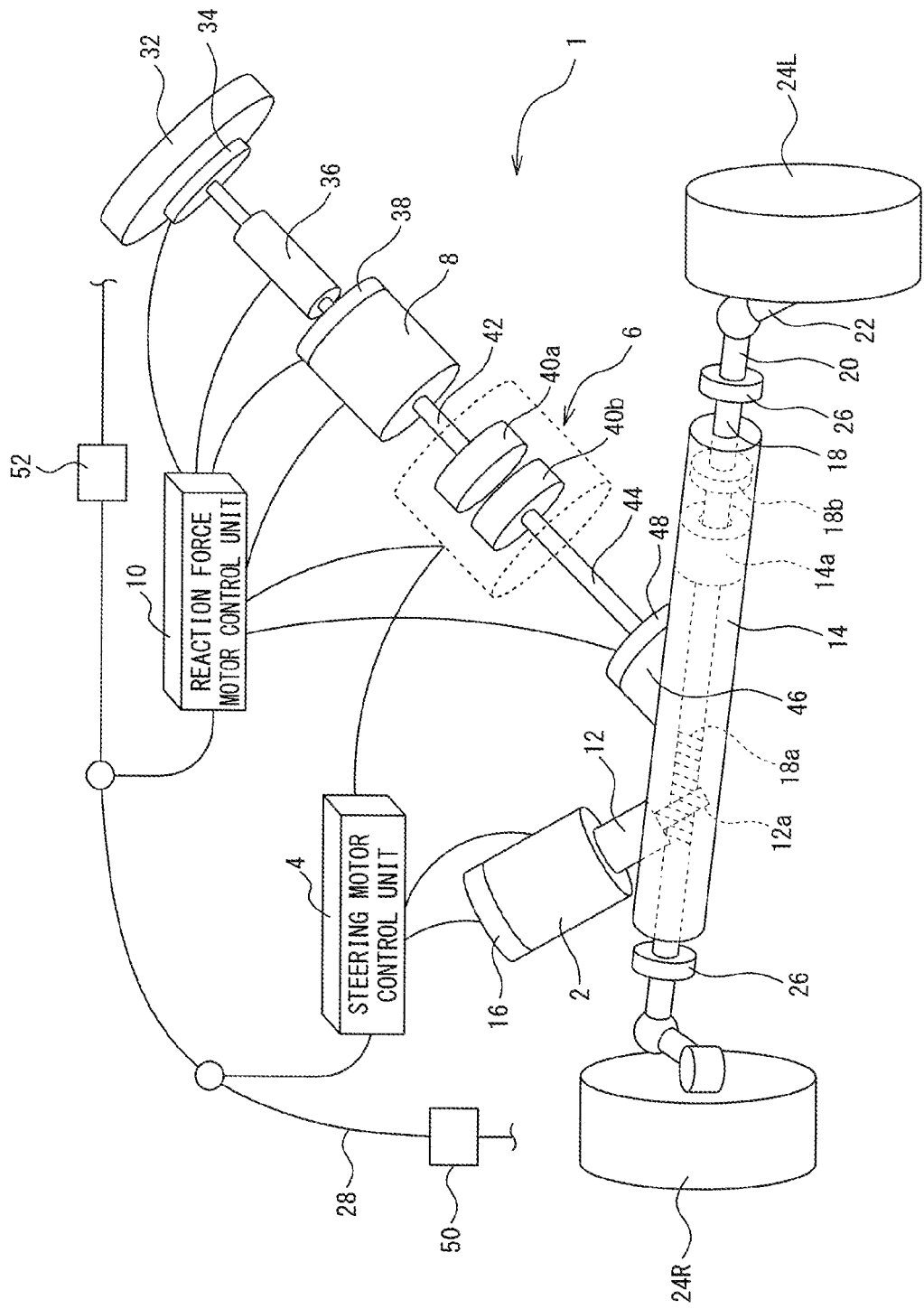
FIG. 1 is a diagram schematically illustrating a configuration of a vehicle including a steering control apparatus of the vehicle according to a first embodiment of the present invention.
Figure 2:
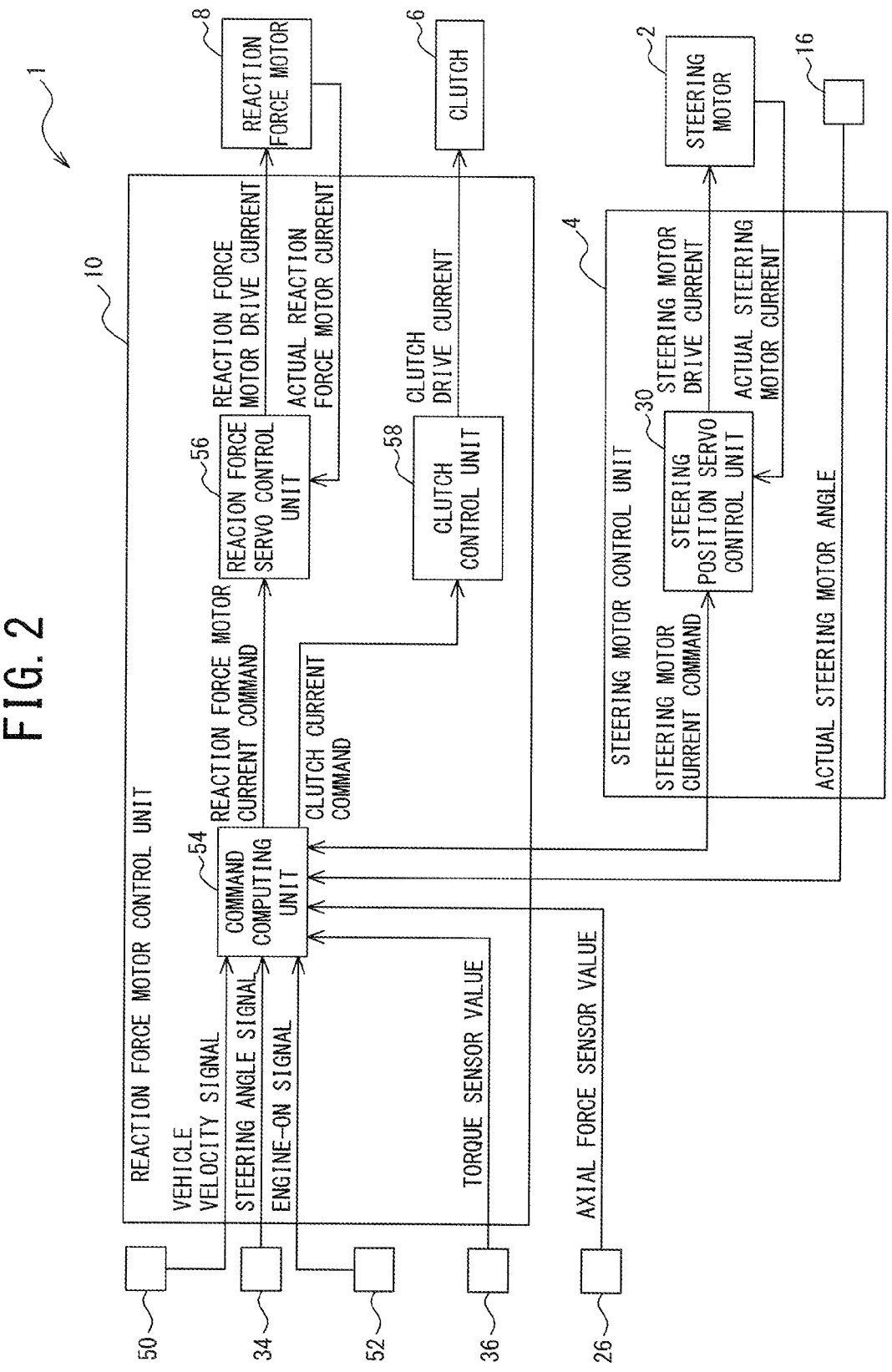
FIG. 2 is a block diagram schematically illustrating a configuration of the steering control apparatus according to the first embodiment of the present invention.

FIG. 1 is a diagram schematically illustrating a configuration of a vehicle including a steering control apparatus 1 of the vehicle (hereinafter, referred to as "steering control apparatus") according to this embodiment. FIG. 2 is a block diagram schematically illustrating a configuration of the steering control apparatus 1 according to this embodiment.

The vehicle including the steering control apparatus 1 according to this embodiment employs the SBW system. Here, in the SBW system, the travel direction of the vehicle is changed by performing a control operation of controlling driving of a steering motor depending on an operation of a steering wheel operated by a vehicle driver to steer turning wheels. The driving control of the steering motor is performed in a state where a torque transmission path between the steering wheel and the turning wheels is mechanically disconnected by switching a clutch interposed between the steering wheel and the turning wheels to a disconnected state which is a normal state.

For example, when abnormality such as disconnection occurs at a part of the SBW system, the steering of the turning wheels continues by using a force applied to the steering wheel by a driver by switching a clutch from a disconnected state to a connected state to mechanically connect the torque transmission path.

As illustrated in FIGS. 1 and 2, the steering control apparatus 1 according to this embodiment includes a steering motor 2, a steering motor control unit 4, a clutch 6, a reaction force motor 8, and a reaction force motor control unit 10.

The steering motor 2 is a motor that is driven in response to a steering motor drive current output from the steering motor control unit 4 and includes a rotatable steering motor output shaft 12. The steering motor 2 outputs a steering torque for steering the turning wheels by the driving based on the steering motor drive current. A tip of the steering motor output shaft 12 is provided with a steering output gear 12a formed of a pinion gear. The steering output gear 12a engages with a rack gear 18a disposed between both ends of a rack shaft 18 inserted into a steering rack 14.

The steering motor 2 is provided with a steering motor angle sensor 16. The steering motor angle sensor 16 detects a rotation angle (i.e., turning angle) of the steering motor 2 and outputs an information signal including the detected rotation angle (also referred to as a "steering motor rotation angle" in the description below) to the reaction force motor control unit 10 via the steering motor control unit 4.

The steering rack 14 is formed to have a cylindrical shape to permit the insertion of the rack shaft 18 to be displaced in the vehicle width direction with rotation of the steering motor output shaft 12, that is, rotation of the steering output gear 12a.

The inside of the steering rack 14 is provided with two stopper portions 14a covering the outer surface of the rack shaft 18 over the entire circumference. The two stopper portions 14a are disposed on the left and right sides in the vehicle width direction of the steering output gear 12a inside the steering rack 14. In FIG. 1, the stopper portion 14a disposed on the right side in the vehicle width direction of the steering output gear 12a out of the two stopper portions 14a is not illustrated.

Parts on the left and right sides in the vehicle width direction of the stopper portions 14a in the part of the rack shaft 18 inserted into the steering rack 14 and located therein are provided with end contact members 18b facing the stopper portions 14a in the axis direction of the rack shaft 18. In FIG. 1, the end contact member 18b disposed on the right side in the vehicle width direction of the stopper portion 14a out of the two end contact members 18b is not illustrated.

Both ends of the rack shaft 18 are connected to the turning wheels 24 via tie rods 20 and knuckle arms 22, respectively. Tire axial force sensors 26 are disposed between the rack shaft 18 and the tie rods 20, respectively. The tire axial force sensor 26 detects an axial force exerting in the axis direction (i.e., vehicle width direction) of the rack shaft 18 and outputs an information signal including the detected axial force (also referred to as a "tire axial force" in the below description) to the reaction force motor control unit 10.

The turning wheels 24 are front wheels (i.e., left and right front wheels) of the vehicle and are steered via the tie rods 20 and the knuckle arms 22 to change the travel direction of the vehicle when the rack shaft 18 is displaced in the vehicle width direction with the rotation of the steering motor output shaft 12. In this embodiment, the turning wheels 24 are assumed to be formed as the left and right front wheels. Accordingly, in FIG. 1, the turning wheel 24 of the left front wheel is referred to as a turning wheel 24L, and the turning wheel 24 of the right front wheel is referred to as a turning wheel 24R.

The steering motor control unit 4 transmits and receives an information signal to and from the reaction force motor control unit 10 via a communication line 28 such as a Controller Area Network (CAN). The steering motor control unit 4 includes a steering position servo control unit 30. The steering position servo control unit 30 computes a steering motor drive current for driving the steering motor 2 and outputs the computed steering motor drive current to the steering motor 2.

Here, the steering motor drive current is a current for controlling the steering torque, calculating an angle (i.e., target turning angle) corresponding to the operation of the steering wheel, and controlling the driving of the steering motor 2 in accordance with the calculated target turning angle.

The computation of the steering motor drive current is performed on the basis of a steering motor current command output from the reaction force motor control unit 10 and a command value of a current (i.e., actual steering motor current) (also referred to as a "steering motor current command It" in the description below) actually supplied to the steering motor 2. Specifically, the steering motor current command is corrected by use of the steering motor current command It to compute the steering motor drive current.

The steering position servo control unit 30 measures the steering motor current command It and estimates the temperature Tt of the steering motor 2 on the basis of the measured steering motor current command It. Then, the steering position servo control unit 30 outputs an information signal including the estimated temperature Tt of the steering motor 2 to the reaction force motor control unit 10. This purpose is to estimate overheating of motors (i.e., the steering motor 2 and the reaction force motor 8) due to resistive heat generation due to the supply of a current.

For example, the steering motor current command It is measured by using a board temperature sensor (not illustrated) built into the steering motor 2 and steering motor. Here, in a method of estimating the temperature Tt of the steering motor 2 on the basis of the steering motor current command It, for example, the steering motor current command is computed by use of the actual current value that has been measured, in a large current zone. Specifically, the measured actual current value is compared with a current threshold value stored beforehand and the measured actual current value is employed as the steering motor current command It, when the measured actual current value is greater than the current threshold value.

On the other hand, in a small current zone, the steering motor current command It is estimated on the basis of the rotation frequency of the steering motor 2 by use of motor NT characteristics in which a relationship between the rotation frequency of the steering motor 2 and the torque is defined. Specifically, a current value estimated on the basis of the rotation frequency of the steering motor 2 by using the motor NT characteristics is employed as the steering motor current command It instead of employing the measured actual current value as the steering motor current command It.

The temperature Tt of the steering motor 2 is estimated by use of the employed steering motor current command It. The clutch 6 is interposed between the steering wheel 32 operated by a driver and the turning wheels 24, and is switched between a disconnected state and a connected state depending on a clutch drive current output from the reaction force motor control unit 10. The clutch 6 is normally in the disconnected state.

Here, when the state of the clutch 6 is switched to the disconnected state, the torque transmission path between the steering wheel 32 and the turning wheels 24 is mechanically disconnected and thus the steering operation of the steering wheel 32 is not transmitted to the turning wheels 24. On the other hand, when the state of the clutch 6 is switched to the connected state, the torque transmission path between the steering wheel 32 and the turning wheels 24 are mechanically connected and thus the steering operation of the steering wheel 32 is transmitted to the turning wheels 24.

A steering angle sensor 34, a steering torque sensor 36, a reaction force motor 8, and a reaction force motor angle sensor 38 are interposed between the steering wheel 32 and the clutch 6. The steering angle sensor 34 is disposed, for example, in a steering column that rotationally supports the steering wheel 32.

The steering angle sensor 34 detects a current steering angle which is a current rotation angle (i.e., an amount of steering operation) of the steering wheel 32. Then, the steering angle sensor 34 outputs an information signal including the detected current steering angle of the steering wheel 32 to the reaction force motor control unit 10. In the description below, the current steering angle may be referred to as a "current steering angle $\theta$".

Here, vehicles these years often normally include a sensor capable of detecting a steering angle of a steering wheel 32. Accordingly, in this embodiment, a description will be given of a sensor, which is an existing sensor in the vehicle, capable of detecting the steering angle of the steering wheel 32 is used as the steering angle sensor 34. The steering torque sensor 36 is disposed, for example, in the steering column that rotationally supports the steering wheel 32, similarly to the steering angle sensor 34.

The steering torque sensor 36 detects a steering torque which is a torque applied to the steering wheel 32 by the driver. The steering torque sensor 36 outputs an information signal including the detected steering torque to the reaction force motor control unit 10. In the description below, the steering torque may be referred to as a "torque sensor value Vts". The reaction force motor 8 and the reaction force motor angle sensor 38 will be described later.

The clutch 6 includes a pair of clutch plates 40 that are disengaged from each other in the disconnected state and that engage with each other in the connected state. In FIG. 1 and the description below, the clutch plate 40 disposed on the steering wheel 32 side of the pair of clutch plates 40 is referred to as a "steering wheel-side clutch plate 40a" and the clutch plate 40 disposed on t the turning wheels 24 side is referred to as a "turning wheel-side clutch plate 40b". The steering wheel-side clutch plate 40a is attached to the steering shaft 42 rotating along with the steering wheel 32, and rotates along with the steering shaft 42.

The turning wheel-side clutch plate 40b is attached to an end of a pinion shaft 44 and rotates along with the pinion shaft 44. The other end of the pinion shaft 44 is disposed in a pinion 46. A pinion gear (not illustrated), which engages with the rack gear 18a, is built in the pinion 46. The pinion gear rotates along with the pinion shaft 44. That is, the pinion gear rotates along with the turning wheel-side clutch plate 40b via the pinion shaft 44. The pinion 46 is provided with a pinion angle sensor 48. The pinion angle sensor 48 detects a rotation angle of the pinion gear and outputs an information signal including the detected rotation angle (also referred to as a "pinion rotation angle" in the description below) to the reaction force motor control unit 10.

The reaction force motor 8 is a motor to be driven depending on a reaction force motor drive current output from the reaction force motor control unit 10, and is capable of outputting a steering reaction force to the steering wheel 32 by rotating the steering shaft 42 rotating along with the steering wheel 32. Here, the steering reaction force output from the reaction force motor 8 to the steering wheel 32 is computed on the basis of the tire axial force exerting on the turning wheels 24 or the steering state of the steering wheel 32 in a state where the clutch 6 is switched to the disconnected sate to mechanically disconnect the torque transmission path between the steering wheel 32 and the turning wheels 24. Accordingly, an appropriate steering reaction force is delivered to the driver steering the steering wheel 32. That is, the steering reaction force output from the reaction force motor 8 to the steering wheel 32 is a reaction force exerting in the opposite direction to the operation direction in which the driver steers the steering wheel 32.

The reaction force motor angle sensor 38 is a sensor disposed in the reaction force motor 8. The reaction force motor angle sensor 38 detects a rotation angle (i.e., turning angle) of the reaction force motor 8 and outputs an information signal including the detected rotation angle (also referred to as a "reaction force motor rotation angle" in the description below) to the reaction force motor control unit 10.

The reaction force motor control unit 10 transmits and receives information signals to and from the steering motor control unit 4 via the communication line 28. In addition, the reaction force motor control unit 10 receives information signals output from a vehicle velocity sensor 50 and an engine controller 52 via the communication line 28.

The reaction force motor control unit 10 controls driving of the reaction force motor 8 on the basis of the information signals received via the communication line 28 or the information signals received from various sensors. The vehicle velocity sensor 50 is, for example, a known vehicle velocity sensor, detects a vehicle velocity of the vehicle, and outputs an information signal including the detected vehicle velocity to the reaction force motor control unit 10. The engine controller 52 (i.e., engine ECU) outputs an information signal including a state (i.e., engine activation or engine stop) of an engine (not illustrated) to the reaction force motor control unit 10.

The reaction force motor control unit 10 includes a command computing unit 54, a reaction force servo control unit 56, and a clutch control unit 58. The command computing unit 54 receives the information signals respectively output from the vehicle velocity sensor 50, the steering angle sensor 34, the engine controller 52, the steering torque sensor 36, the reaction force motor angle sensor 38, the pinion angle sensor 48, the tire axial force sensor 26, and the steering motor angle sensor 16.

The detailed configuration of the command computing unit 54 will be described later. The reaction force servo control unit 56 outputs the reaction force motor drive current for driving the reaction force motor 8 to the reaction force motor 8. The reaction force servo control unit 56 measures a value of the current (i.e., actual current of reaction force motor) actually conducted to the reaction force motor 8 (also referred to as a "reaction force motor current value Ih" in the description below).

Here, the computation of the reaction force motor drive current is performed on the basis of a reaction force motor current command (to be described later) output from the command computing unit 54, and the reaction force motor current value Ih. Specifically, the reaction force motor current command is corrected by the reaction force motor current value Ih to compute the reaction force motor drive current.

The reaction force servo control unit 56 estimates the temperature Th of the reaction force motor 8 on the basis of the measured reaction force motor current value Ih. The temperature Th of the reaction force motor 8 is estimated, for example, in the same procedure as the temperature Tt of the steering motor 2 is estimated by the turning position servo control unit 30.

The clutch control unit 58 computes a current necessary for switching the clutch 6 from the disconnected state to the connected state as a clutch drive current on the basis of a clutch current command (to be described later) output from the command computing unit 54. The clutch control unit outputs the computed clutch drive current to the clutch 6.

Figure 3:
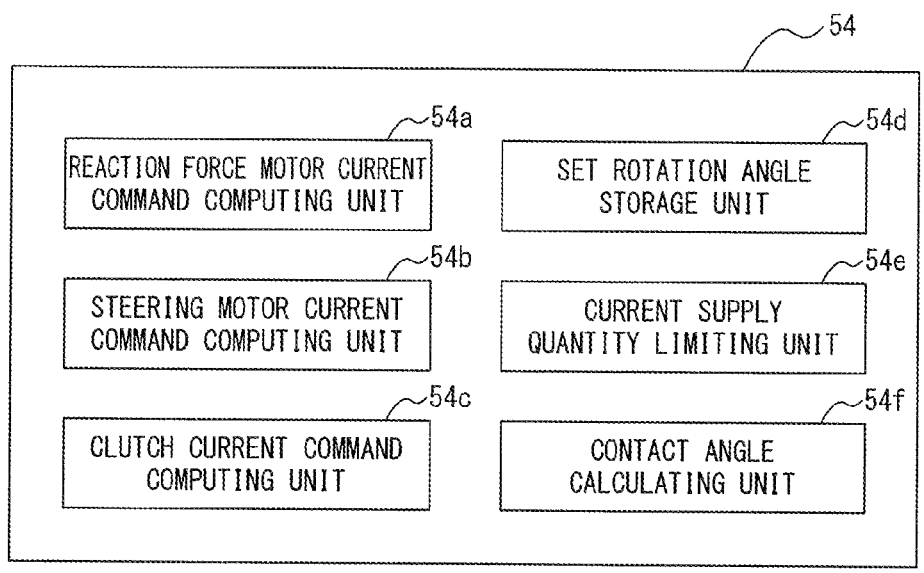
FIG. 3 is a block diagram illustrating a detailed configuration of a command computing unit according to the first embodiment of the present invention.

The detailed configuration of the command computing unit 54 will be described below with the use of FIGS. 3 and 4 while referencing to FIGS. 1 and 2. FIG. 3 is a block diagram illustrating the detailed configuration of the command computing unit 54. As illustrated in FIG. 3, the command computing unit 54 includes a reaction force motor current command computing unit 54a, a steering motor current command computing unit 54b, a clutch current command computing unit 54c, a set rotation angle storage unit 54d, a current supply quantity limiting unit 54e, and a contact rotation angle calculating unit 54f.

The reaction force motor current command computing unit 54a computes the reaction force motor current command on the basis of various information signals input to the command computing unit 54. The reaction force motor current command computing unit 54a outputs the computed reaction force motor current command to the reaction force servo control unit 56. The reaction force motor current command by the reaction force motor current command computing unit 54a is computed by multiplying the steering motor rotation angle θt by a predetermined reaction force motor gain Gh, for example, on the basis of the information signals output from the vehicle velocity sensor 50 and the steering motor angle sensor 16.

Here, the reaction force motor gain Gh is set beforehand by a reaction force motor gain map. The reaction force motor gain map is a map depending on the vehicle velocity, is prepared beforehand, and is then stored in the command computing unit 54. That is, when the reaction force motor current command is defined as "Ih'", the reaction force motor current command Ih' is computed in Expression (1) below.

$$Ih' = \theta t \times Gh \quad (1)$$

The steering motor current command computing unit 54b computes the steering motor current command on the basis of various information signals input to the command computing unit 54. The steering motor current command computing unit 54b outputs the computed steering motor current command to the turning position servo control unit 30.

The steering motor current command by the steering motor current command computing unit 54b is computed by multiplying the current steering angle θ by a predetermined steering motor gain Gt, for example, on the basis of the information signals output from the vehicle velocity sensor 50 and the steering angle sensor 34.

Here, the steering motor gain Gt is set beforehand by a steering motor gain map. The steering motor gain map is a map depending on the vehicle velocity, is prepared beforehand, and is then stored in the command computing unit 54. That is, when the steering motor current command is defined as "It'", the steering motor current command It' is computed in Expression (2) below.

$$It' = \theta \times Gt \quad (2)$$

The clutch current command computing unit 54c computes the clutch current command on the basis of various information signals input to the command computing unit 54. The clutch current command computing unit 54c outputs the computed clutch current command to the clutch control unit 58. The clutch current command by the clutch current command computing unit 54c is computed, for example, by using the temperature Tt of the steering motor 2 estimated by the steering motor control unit 4 and the clutch connection temperature St1.

Specifically, firstly, in a state where the clutch 6 is switched to the disconnected state, the temperature Tt of the steering motor 2 estimated by the steering motor control unit 4 is compared with the clutch connection temperature St1 to determine whether or not the temperature Tt of the steering motor 2 is higher than the clutch connection temperature St1. Here, the clutch connection temperature St1 is a temperature lower by a predetermined temperature difference than a use limit temperature at which it is difficult to use the steering motor 2 normally (i.e., in a normal state, in normal control), is set beforehand, and is then stored in the command computing unit 54. The use limit temperature is set, for example, using a rated temperature preset for the steering motor 2, "JIS C 4003", or the like.

In this embodiment, for example, it is assumed that the clutch connection temperature St1 is set to a temperature lower by 10° C. than the use limit temperature of the steering motor 2. That is, in this embodiment, for example, it is assumed that the predetermined temperature difference is set to "10° C.".

When it is determined that the temperature Tt of the steering motor 2 is higher than the clutch connection temperature St1, a command signal for switching the clutch 6 from the disconnected state (i.e., normal state) to the connected state is computed and the computed command signal is used as the clutch current command.

The clutch current command computing unit 54c also computes a command signal for switching the clutch 6 from the connected state to the disconnected state depending on the temperature Tt of the steering motor 2. The set rotation angle storage unit 54d stores beforehand a set rotation angle. The set rotation angle is a rotation angle of the steering motor 2 corresponding to the set turning angle that is set to an angle smaller than a limit turning angle to which the turning wheels 24 are steerable.

The limit turning angle is the turning angle of the turning wheels 24 in a state where the stopper portion 14a is in contact with the end contact member 18b, and is set beforehand at the time of designing, manufacturing, and shipping a vehicle. That is, in a state where the turning angle of the turning wheels 24 reach the limit turning angle, the turning angle of the turning wheels 24 does not vary (i.e., increase) even when the steering wheel 32 is steered. The set turning angel is an angle smaller than the limit turning angle and is set beforehand depending on the limit turning angle.

In this embodiment, for example, a description will be given that the limit turning angle is set to 500 degrees and the setting turning angle is set to 499 degrees, that is, an angle smaller by 1 degree than the limit turning angle. Therefore, in this embodiment, for example, a description will be given that the set rotation angle is set to the rotation angle of the steering motor 2 in the state where the turning angel of the turning wheels 24 is 499 degrees.

The set rotation angle storage unit 54*d* updates the set rotation angle depending on the deviation between a contact rotation angle calculated by the contact rotation angle calculating unit 54*f* and the set turning angle. The process of updating the set rotation angle in the set rotation angle storage unit 54*d* will be described later.

When the turning wheels 24 is in a steerable limit state where the rotation angle of the steering motor 2 detected by the steering motor angle sensor 16 is equal to or smaller than the set rotation angle, the set rotation angle storage unit 54*d* updates the rotation angle of the steering motor 2 corresponding to the turning angle limited to an angle smaller than the target turning angle as the set rotation angle depending on the rotation angle of the steering motor 2 at that time. The process of updating the set rotation angle in the set rotation angle storage unit 54*d* will be described later.

The limit state is detected by detecting a state where a time in which the actual steering motor current (i.e., q-axis current) is equal to an excessive current value unnecessary for normal turning reaches a predetermined time when the rotation angle of the steering motor 2 is equal to or less than the set rotation angle. That is, when the state where the time in which the actual steering motor current is equal to an excessive current value in a state where the rotation angle of the steering motor 2 is equal to or less than the set rotation angle reaches the predetermined time is detected, the detected state is set as the limit state. The process of detecting the limit state in this way is performed using the steering motor angle sensor 16, the turning position servo control unit 30, the steering angle sensor 34, the steering motor current command computing unit 54*b*, and the set rotation angle storage unit 54*d*.

The timing at which the set rotation angle storage unit 54*d* updates the set rotation angle stored beforehand is set to the timing at which the rotation angle of the steering motor 2 detected by the steering motor angle sensor 16 is less than the set rotation angle stored beforehand and the set rotation angle to be updated. This purpose is to prevent a rapid change of the steering reaction force output from the reaction force motor 8 to the steering wheel 32. The current supply quantity limiting unit 54*e* limits the supply quantity of the steering motor drive current so that the rotation angle of the steering motor 2 detected by the steering motor angle sensor 16 does not exceed the set rotation angle stored beforehand in the set rotation angle storage unit 54*d*.

Specifically, with reference to the rotation angle of the steering motor 2 detected by the steering motor angle sensor 16, a command signal for decreasing the steering motor drive current is output to the steering motor current command computing unit 54*b* so that the referred rotation angle does not exceed the set rotation angle. Here, when generating the command signal for decreasing the steering motor drive current, so that the rotation angle of the steering motor 2 detected by the steering motor angle sensor 16 does not exceed the set rotation angle, for example, a process to be described below is performed.

Figure 4:
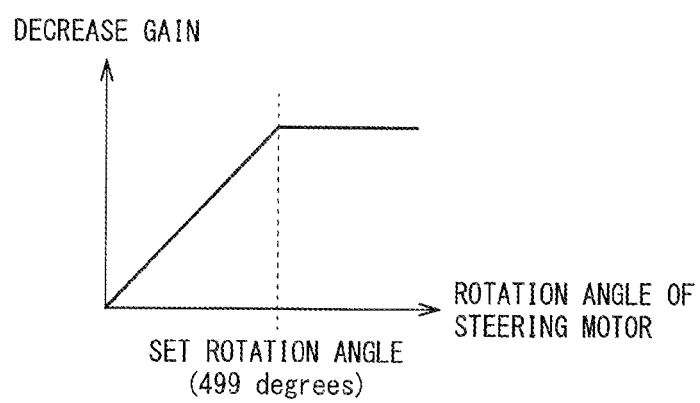
FIG. 4 is a diagram illustrating a relationship between a rotation angle of a steering motor and a decrease gain.

In this process, for example, a decrease gain for decreasing the steering motor drive current is set in accordance with the rotation angle of the steering motor 2 detected by the steering motor angle sensor 16 and the set rotation angle as illustrated in FIG. 4. FIG. 4 is a diagram illustrating a relationship between the rotation angle of the steering motor 2 and the decrease gain. Specifically, a state where the turning angle of the turning wheels 24 is 0 degrees, that is, the state where the turning wheels 24 and the steering wheel 32 are located at the neutral position, the closer the turning angle of the turning wheels 24 becomes to 499 degrees, the greater the decrease gain becomes.

The degree of increase of the decrease gain is set to a degree of increase at which the steering operation of the steering wheel 32 in the direction in which the turning angle increases can be limited at the timing at which the turning angle of the turning wheels 24 reaches 499 degrees.

When generating the command signal for decreasing the steering motor drive current so that the rotation angle of the steering motor 2 detected by the steering motor angle sensor 16 is not greater than the set rotation angle, for example, a process of limiting the target turning angle is performed. This process is performed using a circuit (i.e., limit circuit) capable of increasing and/or decreasing a limit value.

The current supply quantity limiting unit 54*e* generates a command signal for increasing a reaction force as the turning angle of the turning wheels 24 becomes closer to 499 degrees with respect to the state where the turning wheels 24 and the steering wheel 32 are at the neutral position, and outputs the generated command signal to the reaction force servo control unit 56. When the set rotation angle storage unit 54*d* updates the set rotation angle, the command signal for increasing the reaction force is generated in response to the updated set rotation angle.

The current supply quantity limiting unit 54*e* releases the limit on the supply quantity of the steering motor drive current when it is determined that a predetermined permission condition is satisfied. The permission condition is stored in the current supply quantity limiting unit 54*e* beforehand. In this embodiment, for example, it is assumed that the permission condition is a condition in which an integrated travel distance of the vehicle is greater than a predetermined travel distance threshold value. For example, a distance measured by a distance meter (i.e., odometer) which is an existing element in a general vehicle is used as the integrated travel distance of the vehicle.

In this embodiment, for example, it is assumed that the travel distance threshold value is 10000 kilometers (i.e., km). Therefore, in this embodiment, when the integrated travel distance of the vehicle is greater than 10000 km, the current supply quantity limiting unit 54*e* determines that the predetermined permission condition is satisfied and releases the limit on the supply quantity of the steering motor drive current.

In this embodiment, after the integrated travel distance of the vehicle is greater than 10000 km, the current supply quantity limiting unit 54*e* determines that the predetermined permission condition is satisfied whenever the integrated travel distance is greater than 10000 km. That is, when the integrated travel distance is greater than 20000 km after the integrated travel distance of the vehicle has been greater than 10000 km, the current supply quantity limiting unit 54*e* determines that the predetermined permission condition is satisfied.

The contact rotation angle calculating unit 54*f* calculates the contact rotation angle in a state where the current supply quantity limiting unit 54*e* determines that the predetermined permission condition is satisfied and releases the limit on the supply quantity of the steering motor drive current. In this situation, the contact rotation angle is the rotation angle of the steering motor 2 corresponding to a state where the steered angel of the turning wheels 24 reaches the limit turning angle, that is, a state where the stopper portions 14a are brought into contact with the end contact members 18b.

Therefore, when the contact rotation angle calculating unit 54f calculates the contact rotation angle, the rotation angel of the steering motor 2 corresponding to the state where the turning angle of the turning wheels 24 is set to the limit turning angle is detected in the state where the current supply quantity limiting unit 54e releases the limit on the supply quantity of the steering motor drive current. The detected rotation angle of the steering motor 2 is calculated as the contact rotation angle.

Here, when the rotation angel of the steering motor 2 corresponding to the state where the turning angle of the turning wheels 24 is set to the limit turning angle is detected, for example, the contact rotation angle calculating unit 54f refers to the actual steering motor current based on the information signal input to the steering position servo control unit 30. When the state where the time in which the actual steering motor current (i.e., q-axis current) is equal to an excessive current value (for example, 90 Arms) unnecessary for normal steering reaches a predetermined time (for example, 1 s) is detected, the steering motor rotation angle in this state is calculated as the contact rotation angle.

The reason of performing the above-mentioned process is that servo control on the steering motor 2 is performed by the steering position servo control unit 30 in this embodiment and thus an excessive command voltage is output in the state where the stopper portion 14a is brought into contact with the end contact member 18b. In addition to this, when the stopper portion 14a and the end contact member 18b come in contact with each other and the rotation of the steering motor 2 stops, an excessive current greater than a current quantity necessary for the normal steering flows through the steering motor 2.

The excessive current value unnecessary for the steering or the predetermined time is set beforehand, for example, according to the structure of the vehicle and is then stored in the contact rotation angle calculating unit 54f. It is preferable that the calculation of the contact rotation angle be performed while the vehicle is traveling. The reason is that there is a possibility that the turning wheels 24 come in contact with a curbstone or the like or a possibility that the turning wheel is stuck (or fall) into a side ditch (i.e., trench) in the state where the vehicle stops, and thus there is a possibility of not accurately calculating the contact rotation angle.

A process of causing the set rotation angle storage unit 54d to update the set rotation angle depending on the deviation between the contact rotation angle calculated by the contact rotation angle calculating unit 54f and the set turning angle will be described below.

When the contact rotation angle calculating unit 54f calculates the contact rotation angle, the set rotation angle storage unit 54d updates the set rotation angle to an angle obtained by subtracting the deviation between the limit turning angle and the set turning angle from the contact rotation angle calculated by the contact rotation angle calculating unit 54f.

In this embodiment, when the set rotation angle storage unit 54d updates the set rotation angle to the angle obtained by subtracting the deviation between the limit turning angle and the set turning angle from the contact rotation angle, the following process is performed. In this embodiment, the limit turning angle is set to 500 degrees and the set turning angle is set to 499 degrees. That is, in this embodiment, the deviation between the limit steered angel and the set turning angle is 1 degree.

Therefore, when the set rotation angle storage unit 54d updates the set rotation angle depending on the deviation between the contact rotation angle and the set turning angle, the process of updating the set rotation angle to the angle obtained by subtracting 1 degree from the contact rotation angle is performed. The process of causing the set rotation angle storage unit 54d to update the set rotation angle depending on the deviation between the contact rotation angle and the set turning angle is performed individually on the left and right front wheels, that is, the turning wheel 24L and the turning wheel 24R.

A process of updating the set rotation angle depending on the rotation angle of the steering motor 2, when a limit state is detected in a state where the rotation angle of the steering motor 2 is equal to or less than the set rotation angle, will be described below.

When the limit state, that is, the state where the turning angle of the turning wheels 24 is limited to an angle smaller than the target turning angle, is detected in the state where the rotation angle of the steering motor 2 detected by the steering motor angle sensor 16 is equal to or less than the set rotation angle, there is a possibility that a state described below is occurring.

That is, in the state where the time in which the actual steering motor current (i.e., q-axis current) is equal to an excessive current value unnecessary for the normal wheel steering reaches a predetermined time in the state where the rotation angle of the steering motor 2 is equal to or less than the set rotation angle reaches the predetermined time, there is a possibility that the stopper portion 14a comes in contact with the end contact member 18b. The excessive current value is, for example, 90 Arms and the predetermined time is, for example, 1 s.

Therefore, when the time in which the actual steering motor current is equal to an excessive current value in the state where the rotation angle of the steering motor 2 is equal to or less than the set rotation angle reaches the predetermined time, the set rotation angle storage unit 54d detects the rotation angle of the steering motor 2 corresponding to the turning angle limited to an angle smaller than the target turning angle. Then, the set rotation angle storage unit performs the process of updating the set rotation angle to the detected rotation angle of the steering motor 2.

The process of causing the set rotation angle storage unit 54d to update the set rotation angle to the rotation angle of the steering motor 2 corresponding to the turning angle limited to an angle smaller than the target turning angle is performed individually on the left and right wheels, that is, the turning wheel 24L and the turning wheel 24R.

When the limit state is detected in the state where the rotation angle of the steering motor 2 is equal to or less than the set rotation angle, the process of updating the set rotation angle depending on the rotation angle of the steering motor 2 at that time may be performed differently depending on the vehicle state. In this case, when the time in which the actual steering motor current is equal to an excessive current value reaches the predetermined time, as described above, in the state where the vehicle travels, the process of updating the set rotation angle to the rotation angle of the steering motor 2 corresponding to the turning angle limited to an angle smaller than the target turning angle is performed.

On the other hand, in the state where the vehicle stops, it is determined whether or not the time in which the actual steering motor current is equal to an excessive current value in the state where the rotation angle of the steering motor 2 is greater than the set rotation angle reaches the predetermined time. When it is determined that the time in which the actual steering motor current is equal to an excessive current value reaches the predetermined time, the process of updating the set rotation angle to the rotation angle of the steering motor 2 corresponding to the turning angle limited to an angle smaller than the target turning angle is performed. The reason is that there is a possibility that the turning wheels 24 come in contact with a curbstone or the like or a possibility that the turning wheel will be stuck (or fall) into a side ditch (i.e., trench) in the state where the vehicle stops, and thus there is a possibility that the turning angle of the turning wheels 24 does not actually reach the limit. The state where the vehicle stops includes states where the vehicle velocity does not reach a speed (for example, 5 km/h) at which the vehicle can be considered to be traveling.

An example of the operation of the steering control apparatus 1 according to this embodiment will be described below with reference to FIGS. 1 to 4. When the steering control apparatus 1 is activated, the current supply quantity limiting unit 54e limits the supply quantity of the steering motor drive current not to make the rotation angle of the steering motor 2 detected by the steering motor angle sensor 16 greater than the set rotation angle (499 degrees) even when the driver performs the full steering. The full steering is a state where the driver operates the steering wheel 32 so that the actual turning angle of the turning wheels 24 is equal to the limit turning angle at the time of parking or the like.

Accordingly, in the steering control apparatus 1 according to this embodiment, even when the driver performs the full steering at the time of driving or stopping the vehicle, it is possible to suppress contact between the rack end and the steering rack and thus to suppress supply of the excessive steering motor drive current to the steering motor. In addition, even when the driver performs the full steering at the time of driving or stopping the vehicle, it is possible to suppress an increase in the drive force output from the steering motor 2 and thus to suppress degradation of the steering motor 2.

The current supply quantity limiting unit 54e determines that the predetermined permission condition is satisfied when the integrated travel distance of the vehicle is greater than the travel distance threshold value (e.g., 10000 km), and releases the limit on the supply quantity of the steering motor drive current.

When the current supply quantity limiting unit 54e releases the limit on the supply quantity of the steering motor drive current, the contact rotation angle calculating unit 54f calculates the contact rotation angle. Then, the set rotation angle storage unit 54d updates the set rotation angle depending on the deviation between the contact rotation angle calculated by the contact rotation angle calculating unit 54f and the set turning angle.

When the limit state is detected in the state where the rotation angle of the steering motor 2 is equal to or less than the set rotation angle, the set rotation angle storage unit 54d updates the set rotation angel to the rotation angle of the steering motor 2 corresponding to the turning angle limited to an angle smaller than the target turning angle.

Accordingly, in the steering control apparatus 1 according to this embodiment, even when a positional relationship between the rotation angle of the steering motor 2 detected by the steering motor angle sensor 16 and the rack shaft 18 varies from the relationship at the time of shipping of the vehicle from a factory, it is possible to update the set rotation angle depending on the variation amount. The positional relationship between the rotation angle of the steering motor 2 detected by the steering motor angle sensor 16 and the rack shaft 18 is specifically, a positional relationship between the rack end and the steering rack 14 and a relationship between engagement positions of the steering output gear 12a and the rack gear 18a.

The variation in the positional relationship between the rotation angle of the steering motor 2 and the rack shaft 18 occurs when looseness of the engagement between the steering output gear 12a and the rack gear 18a becomes greater than an appropriate value or by a variation in a degree of fastening of a retainer for cancelling the looseness.

That is, when the looseness occurring in the engagement between the steering output gear 12a and the rack gear 18a is greater than an appropriate value due to the increase in the integrated travel distance of the vehicle, the positional relationship between the rotation angle of the steering motor 2 and the rack shaft 18 varies from that at the time of shipping of the vehicle from the factory. Accordingly, even when the rotation angle of the steering motor 2 detected by the steering motor angle sensor 16 reaches an angle at which the turning angle is the limit turning angle, the stopper portion 14a and the end contact member 18b do not come in contact with each other and thus there is a problem in that the turning radius of the vehicle increases On the other hand, when a degree of fastening of a retainer in a repair garage or the like is greater than an appropriate value, the looseness is cancelled and becomes less than an appropriate value. Accordingly, even when the rotation angle of the steering motor 2 detected by the steering motor angle sensor 16 does not reach the angle at which the turning angle is equal to the limit turning angle, the stopper portion 14a and the end contact member 18b come in contact with each other. As a result, an excessive steering motor drive current is supplied to the steering motor 2, thereby shortening the lifetime of the motor due to generation of heat.

Regarding this problem, in the steering control apparatus 1 according to this embodiment, since the set rotation angle can be updated as described above, it is possible to suppress an increase in the turning radius of the vehicle or an increase in the drive force output from the steering motor 2.

In the above description, the steering motor angle sensor 16 corresponds to the steering motor angle detecting unit. The steering position servo control unit 30 and the steering motor current command computing unit 54b correspond to the steering motor drive current supply unit. The steering motor angle sensor 16, the steering position servo control unit 30, the steering angle sensor 34, the steering motor current command computing unit 54b, and the set rotation angle storage unit 54d correspond to the turning angle limit state detecting unit that detects the above-mentioned limit state.

Advantageous Effects of the First Embodiment include the following:

(1) The current supply quantity limiting unit 54e limits the supply quantity of the steering motor drive current so that the rotation angle of the steering motor 2 detected by the steering motor angle sensor 16 is not greater than the set rotation angle stored beforehand in the set rotation angle storage unit 54d. Accordingly, even when the driver performs the full steering at the time of driving or stopping the vehicle, it is possible to suppress contact of the steering rack 14 with the rack end and thus to suppress supply of the excessive steering motor drive current to the steering motor 2. As a result, even when the driver performs the full wheel steering at the time of driving or stopping the vehicle, it is possible to suppress an increase in the drive force output from the steering motor 2 and thus to suppress degradation of the steering motor 2.

(2) When it is determined that the predetermined permission condition is satisfied, the current supply quantity limiting unit 54e releases the limit on the supply quantity of the steering motor drive current. Accordingly, when it is determined that the predetermined permission condition is satisfied, it is possible to provide an opportunity to detect whether or not the set rotation angle stored beforehand in the set rotation angle storage unit 54*d* varies from the time point of setting the set rotation angle such as the time of shipping of the vehicle from the factory. As a result, by providing an opportunity to correct the set rotation angle to an appropriate value, it is possible to reduce a possibility that the rack end and the steering rack 14 come in contact with each other when the driver performs the full wheel steering at the time of driving or stopping the vehicle.

(3) When the current supply quantity limiting unit 54*e* releases the limit on the supply quantity of the steering motor drive current, the contact rotation angle calculating unit 54*f* calculates the contact rotation angle which is the rotation angle of the steering motor 2 corresponding to the state where the turning angle of the turning wheel 24 is equal to the limit turning angle. In addition, the set rotation angle storage unit 54*d* updates the set rotation angle depending on the deviation between the contact rotation angle calculated by the contact rotation angle calculating unit 54*f* and the set turning angle. Accordingly, even when the positional relationship between the rack end and the steering rack 14 varies from that of the time of the vehicle shipment from the factory due to an increase in the integrated travel distance of the vehicle or a maintenance condition, it is possible to update the set rotation angle depending on the variation amount. As a result, it is possible to update the set rotation angle to a value capable of reducing the possibility that the rack end and the steering rack 14 come in contact with each other depending on the variation amount of the positional relationship between the rack end and the steering rack 14 from the state at the time of shipping of the vehicle from the factory.

(4) The permission condition for causing the current supply quantity limiting unit 54*e* to release the limit on the supply quantity of the steering motor drive current is set to the condition in which the integrated travel distance of the vehicle is greater than a predetermined travel distance threshold value. Accordingly, even when the integrated travel distance of the vehicle increases and becomes greater than the travel distance threshold value and the looseness occurring in the engagement between the steering output gear 12*a* and the rack gear 18*a* increases greater than an appropriate value, it is possible to update the set rotation angle to an appropriate value depending on the degree of increase. As a result, it is possible to adjust the turning angle of the turning wheels 24 and the positional relationship between the stopper portion 14*a* and the end contact member 18*b* and to suppress an increase in the turning radius of the vehicle.

(5) When the limit state is detected in a state where the rotation angle of the steering motor 2 detected by the steering motor angle sensor 16 is equal to or less than the set rotation angle, the set rotation angle storage unit 54*d* updates the set rotation angle to the rotation angle of the steering motor 2 corresponding to the turning angle limited to an angle smaller than the target turning angle. Accordingly, even when a degree of fastening of a retainer in a repair garage or the like becomes greater than an appropriate value and the looseness occurring in the engagement between the steering output gear 12*a* and the rack gear 18*a* decreases less than an appropriate value, it is possible to update the set rotation angle to an appropriate value depending on the degree of decrease. As a result, since it is possible to adjust the turning angle of the turning wheels 24 and the positional relationship between the stopper portion 14*a* and the end contact member 18*b* and to suppress an increase in the turning radius of the vehicle, it is possible to suppress an increase in the drive force output from the steering motor 2.

Modification Examples include the following:

(1) In the steering control apparatus 1 according to this embodiment, the set turning angle is set to an angle smaller than the limit turning angle, but the set turning angle is not limited to the angle and may be changed depending on the position relationship at the time of designing of the vehicle or the like between the stopper portion 14*a* and the end contact member 18*b*.

(2) In the steering control apparatus 1 according to this embodiment, the travel distance threshold value is set to 10000 km, but the travel distance threshold value is not limited to the value and may be changed depending on the configuration and structure of the vehicle or the main purpose of use thereof (such as frequent traveling on the irregular ground).

A second embodiment of the present invention (hereinafter, referred to as "this embodiment") will be described below with reference to the accompanying drawings. Descriptions of the same elements as those in the first embodiment are omitted in some cases.

The steering control apparatus 1 according to this embodiment has the same configuration as the first embodiment except for the configuration of the current supply quantity limiting unit 54*e*, and thus description of the other configuration may not be repeated. Similarly to the first embodiment, the current supply quantity limiting unit 54*e* releases the limit on the supply quantity of the steering motor drive current when it is determined that a predetermined permission condition is satisfied.

Figure 5A:
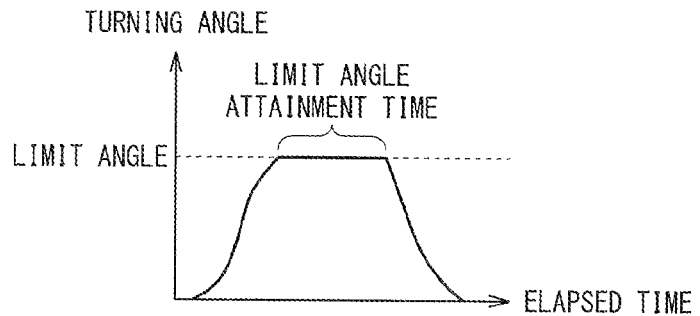
FIG. 5A to FIG. 5C are diagrams illustrating parameters used in a process performed by a current supply quantity limiting unit according to a second embodiment of the present invention.

In this embodiment, for example, as illustrated particularly in FIG. 5A, it is assumed that the permission condition is set to a condition in which a limit angle attainment time which is a time in which the turning angle of the turning wheels 24 is equal to the limit turning angle is greater than a predetermined attainment time threshold value. The attainment time threshold value is stored in the current supply quantity limiting unit 54*e* beforehand.

The reason of setting the permission condition to the condition in which the limit angle attainment time is greater than the attainment time threshold value will be described below. When the turning radius of the vehicle increases in comparison with that at the time of shipping of the vehicle from a factory, a frequency in which a driver performs full wheel steering so as to turn the vehicle at the time of parking or low-speed traveling of the vehicle increases. When the frequency in which the driver performs the full wheel steering increases, the time in which the turning angle of the turning wheels 24 reaches the limit turning angle, that is, the limit angle attainment time, increases. Accordingly, the limit angle attainment time is detected, and the limit on the supply quantity of the steering motor drive current is released to calculate the contact rotation angle when the detected limit angle attainment time is greater than the attainment time threshold value.

Figure 5B:
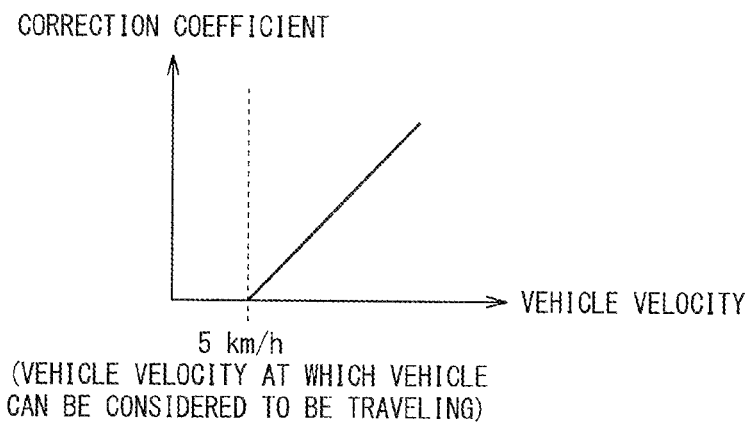
Figure 5C:
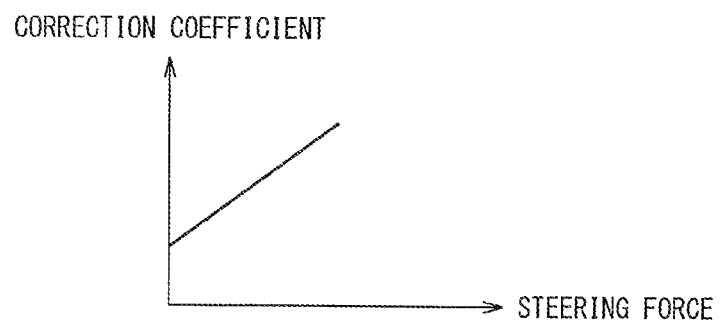

In this embodiment, for example, as illustrated in FIGS. 5B and 5C, it is assumed that as the vehicle velocity of the vehicle and the steering force applied to the steering wheel 32 increase, the attainment time threshold value is corrected to decrease. FIG. 5A to FIG. 5C are diagrams illustrating parameters used for the process performed by the current supply quantity limiting unit 54*e* in this embodiment, where FIG. 5A is a diagram illustrating a relationship between the turning angle of the turning wheels 24 and the elapsed time, FIG. 5B is a diagram illustrating a relationship between a correction coefficient for correcting the attainment time threshold value so as to decrease and the vehicle velocity of the vehicle, and FIG. 5C is a diagram illustrating a relationship between the correction coefficient for correcting the attainment time threshold value so as to decrease and the steering force applied to the steering wheel 32.

Therefore, in this embodiment, when the limit angle attainment time is greater than the predetermined attainment time threshold value, the current supply quantity limiting unit 54e determines that the predetermined permission condition is satisfied and releases the limit on the supply quantity of the steering motor drive current. In this embodiment, as illustrated in FIG. 5B, the correction coefficient for correcting the attainment time threshold value to decrease increases as the vehicle velocity of the vehicle increases. As illustrated in FIG. 5B, the correction coefficient is set to "0" in a state where the vehicle velocity of the vehicle does not reach a speed (e.g., 5 km/h) at which the vehicle can be considered to be traveling.

In this embodiment, as illustrated in FIG. 5C, the correction coefficient for correcting the attainment time threshold value to decrease increases as the steering force applied to the steering wheel 32 by the driver increases. As illustrated in FIG. 5C, even when the steering force applied to the steering wheel 32 by the driver is "0", the correction coefficient is set to a certain magnitude (i.e., a positive value).

Therefore, in this embodiment, the correction coefficient increasing as the vehicle velocity of the vehicle increases and the correction coefficient increasing as the steering force applied to the steering wheel 32 by the driver increases are integrated and the attainment time threshold value is corrected to decrease using the integrated values The reason of correcting the attainment time threshold value to decrease as the vehicle velocity of the vehicle and the steering force applied to the steering wheel 32 increase will be described below. The frequency in which the driver performs the full wheel steering decreases as the vehicle velocity increases (i.e., becomes higher). Accordingly, when the attainment time threshold value is large in the state where the vehicle velocity is high, there is a high possibility that the turning radius of the vehicle increases in comparison with that at the time of shipping of the vehicle from the factory.

Accordingly, as illustrated in FIG. 5B, in the state where the vehicle velocity reaches the speed at which the vehicle can be considered to be traveling, the correction coefficient increases as the vehicle velocity increases, and the attainment time threshold value is corrected to decrease. Accordingly, the frequency in which the limit on the supply quantity of the steering motor drive current is released increases to correspond to the increase of the turning radius of the vehicle. When the turning radius of the vehicle increases in comparison with that at the time of shipping of the vehicle from a factory, the driver applies a large steering force to the steering wheel 32 so as to perform the full wheel steering in a state where the driver desires to turn the vehicle in a small radius, in comparison with the forward traveling.

In this case, the extent to which the driver desires to turn the vehicle in a small radius can be estimated on the basis of the magnitude of the steering force applied to the steering wheel 32 by the driver. Accordingly, it can be estimated that the larger the steering force applied to the steering wheel 32 by the driver is, the larger the turning radius of the vehicle is. Accordingly, as illustrated in FIG. 5C, as the steering force applied to the steering wheel 32 by the driver increases, the attainment time threshold value is corrected to decrease by increasing the correction coefficient. As a result, the frequency in which the limit on the supply quantity of the steering motor drive current is released increases to correspond to the increase of the turning radius of the vehicle.

An example of the operation which is performed by the steering control apparatus 1 according to this embodiment will be described below with reference to FIGS. 1 to 5.

Description of the same operation as in the first embodiment may not be repeated. When the steering control apparatus 1 is activated, the current supply quantity limiting unit 54e limits the supply quantity of the steering motor drive current so that the rotation angle of the steering motor 2 detected by the steering motor angle sensor 16 is not greater than the set rotation angle even when the driver performs the full wheel steering.

When the limit angle attainment time is greater than a predetermined attainment time threshold value, the current supply quantity limiting unit 54e determines that a predetermined permission condition is satisfied and releases the limit on the supply quantity of the steering motor drive current. When the current supply quantity limiting unit 54e releases the limit on the supply quantity of the steering motor drive current, the set rotation angle storage unit 54d updates the set rotation angle depending on the deviation between the contact rotation angle calculated by the contact rotation angle calculating unit 54f and the set turning angle.

Accordingly, in the steering control apparatus 1 according to this embodiment, it is possible to update the set rotation angle depending on the limit angle attainment time which is the time based on the frequency in which the driver performs the full wheel steering. As a result, even when the turning radius of the vehicle increases in comparison with that at the time of shipping of the vehicle from a factory, it is possible to update the set rotation angle depending on the increase in the turning radius.

The current supply quantity limiting unit 54e corrects the attainment time threshold value to decrease as the vehicle velocity of the vehicle and the steering force applied to the steering wheel 32 increase. Accordingly, in the steering control apparatus 1 according to this embodiment, by correcting the attainment time threshold value to decrease to correspond to the increase in the turning radius of the vehicle, it is possible to increase the frequency in which the limit on the supply quantity of the steering motor drive current is released.

Advantageous Effects of the Second Embodiment include the following:

(1) The permission condition for causing the current supply quantity limiting unit 54e to release the limit on the supply quantity of the steering motor drive current is set to the condition in which the limit angle attainment time which is the time in which the turning angle of the turning wheels 24 is equal to the limit turning angle is greater than the predetermined attainment time threshold value. Accordingly, it is possible to update the set rotation angle depending on the limit angle attainment time which is the time based on the frequency in which the driver performs the full wheel steering. As a result, even when the turning radius of the vehicle increases in comparison with that at the time of shipping of the vehicle from a factory, it is possible to update the set rotation angle depending on the increase in the turning radius. As a result, it is possible to adjust the turning angle of the turning wheels 24 and the positional relationship between the stopper portion 14a and the end contact member 18b depending on the increase in the turning radius of the vehicle from that at the time of shipping of the vehicle from a factory and thus to suppress the increase in the turning radius of the vehicle.

(2) As the vehicle velocity of the vehicle and the steering force applied to the steering wheel 32 increase, the attainment time threshold value which is the time based on the frequency in which the driver performs the full wheel steering is corrected to decrease. Accordingly, by correcting the attainment time threshold value to decrease to correspond to the increase in the turning radius of the vehicle, it is possible to increase the frequency in which the limit on the supply quantity of the steering motor drive current is released. As a result, it is possible to adjust the turning angle of the turning wheels 24 and the positional relationship between the stopper portion 14a and the end contact member 18b and thus to suppress the increase in the turning radius of the vehicle.

(Modification Examples include the following:

(1) In the steering control apparatus 1 according to this embodiment, the permission condition is set to the condition in which the limit angle attainment time is greater than the attainment time threshold value, but the permission condition is not limited to this condition. That is, in addition to the condition in which the limit angle attainment time is greater than the attainment time threshold value, the condition, which is the permission condition in the first embodiment, in which the integrated travel distance of the vehicle is greater than a predetermined travel distance threshold value may be used as the permission condition.

(2) In the steering control apparatus 1 according to this embodiment, the attainment time threshold value is corrected to decrease as the vehicle velocity of the vehicle and the steering force applied to the steering wheel 32 increase, but the present invention is not limited to this configuration. That is, a configuration in which the attainment time threshold value is corrected to decrease as the vehicle velocity of the vehicle or the steering force applied to the steering wheel 32 increases may be employed. In brief, the attainment time threshold value has only to be corrected to decrease as at least one of the vehicle velocity of the vehicle and the steering force applied to the steering wheel 32 increase.

A third embodiment of the present invention (hereinafter, referred to as "this embodiment") will be described below with reference to the accompanying drawings. Descriptions of the same elements as those in the first embodiment are omitted in some cases.

The steering control apparatus 1 according to this embodiment has the same configuration as the first embodiment except for the configuration of the command computing unit 54, and thus description of the other configuration may not be repeated.

Figure 6:
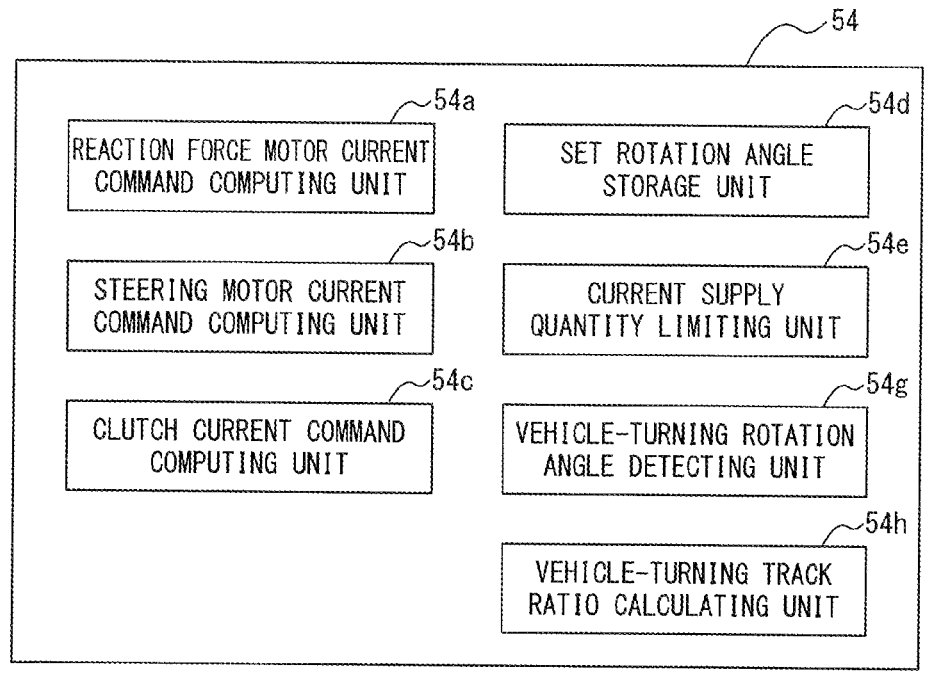
FIG. 6 is a block diagram illustrating a detailed configuration of a command computing unit according to a third embodiment of the present invention.

The detailed configuration of the command computing unit 54 will be described below with reference to FIGS. 1 to 5 through the use of FIGS. 6 to 8. FIG. 6 is a block diagram illustrating the detailed configuration of the command computing unit 54. As illustrated in FIG. 6, the command computing unit 54 includes a reaction force motor current command computing unit 54a, a steering motor current command computing unit 54b, and a clutch current command computing unit 54c. In addition, the command computing unit 54 further includes a set rotation angle storage unit 54d, a current supply quantity limiting unit 54e, and a vehicle-turning rotation angle detecting unit 54g, and a vehicle-turning track ratio calculating unit 54h.

The configurations of the reaction force motor current command computing unit 54a, the steering motor current command computing unit 54b, the clutch current command computing unit 54c, and the set rotation angle storage unit 54d are the same as in the first embodiment and description thereof will not be repeated. The current supply quantity limiting unit 54e limits the supply quantity of the steering motor drive current so that the rotation angle of the steering motor 2 detected by the steering motor angle sensor 16 is not greater than the set rotation angle stored beforehand in the set rotation angle storage unit 54d.

Specifically, with reference to the rotation angle of the steering motor 2 detected by the steering motor angle sensor 16, a command signal for decreasing the steering motor drive current so that the referred rotation angle is not greater than the set rotation angle is output to the steering motor current command computing unit 54b. Here, when generating the command signal for decreasing the steering motor drive current so that the rotation angle of the steering motor 2 detected by the steering motor angle sensor 16 is not greater than the set rotation angle, for example, the same process as in the first embodiment is performed.

With respect to a state where the turning wheels 24 and the steering wheel 32 are located at the neutral position, the current supply quantity limiting unit 54e generates a command signal for increasing a reaction force as the turning angle of the turning wheels 24 becomes to 499 degrees and outputs the generated command signal to the reaction force servo control unit 56. When the set rotation angle storage unit 54d updates the set rotation angle, the command signal for increasing the reaction force is also generated on the basis of the updated set rotation angle.

The vehicle-turning rotation angle detecting unit 54g detects a vehicle-turning rotation angle. Here, the vehicle-turning rotation angle is the vehicle-rotation angle of the steering motor 2 when the vehicle turns at the turning angle of the turning wheels 24 set as the set turning angle and is detected, for example, using the steering motor angle sensor 16. That is, when detecting the vehicle-turning rotation angle, the vehicle-turning rotation angle detecting unit 54g detects the rotation angle of the steering motor 2 in the state where the vehicle turns at the turning angle of the turning wheels 24 set as the set turning angle, and sets the detected rotation angle of the steering motor 2 as the vehicle-turning rotation angle.

In this embodiment, for example, it is assumed that the vehicle-turning rotation angle detecting unit 54g detects the vehicle-turning rotation angle when it is determined the deviation between a predetermined set track ratio and a turning track ratio calculated by the turning track ratio calculating unit 54h is greater than a predetermined deviation threshold value. The set track ratio is a design value of the vehicle, is set at the time of designing of the vehicle, manufacturing of the vehicle, shipping of the vehicle from a factory, and the like, and is stored beforehand in the vehicle-turning rotation angle detecting unit 54g.

The process of causing the vehicle-turning rotation angle detecting unit 54g to determine that the deviation between the set track ratio and the turning track ratio is greater than a deviation threshold value and to detect the vehicle-turning rotation angle will be described later. The turning track ratio calculating unit 54h calculates the turning track ratio when the vehicle turns at the turning angle of the turning wheels 24 set as the set turning angle. Here, the turning track ratio is a track ratio of an inner track which is a track of an inner turning wheel rotating inside in the vehicle width direction of the vehicle at the time of turning and an outer track which is a track of an outer turning wheel rotating outside in the vehicle width direction of the vehicle at the time of turning.

That is, the turning wheels 24 includes the inner turning wheel rotating inside in the vehicle width direction of the vehicle at the time of turning and the outer turning wheel rotating outside in the vehicle width direction of the vehicle at the time of turning. In this embodiment, for example, as illustrated in FIG. 7, the turning state is assumed to be a travel state in which the turning angle of the turning wheels 24 is set as the set rotation angle to the right side. Accordingly, in this embodiment, the turning wheel 24R (i.e., right front wheel) corresponds to the inner turning wheel and the turning wheel 24L (i.e., left front wheel) corresponds to the outer turning wheel.

Figure 7:
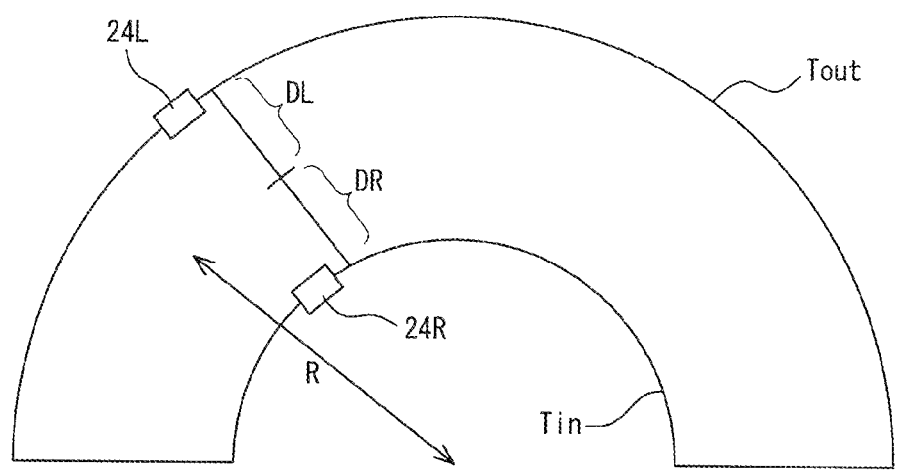
FIG. 7 is a diagram illustrating a turning state of the vehicle.

FIG. 7 is a diagram illustrating a turning state of a vehicle. In FIG. 7, the average turning radius of the vehicle is represented by reference sign "R", the distance in the vehicle width direction from the center in the vehicle width direction of the vehicle to the rotation center of the turning wheel 24L is represented by reference sign "DL", and the distance in the vehicle width direction from the center in the vehicle width direction of the vehicle to the rotation center of the turning wheel 24R is represented by reference sign "DR". In FIG. 7, the inner track is represented by reference sign "Tin" and the outer track is represented by reference sign "Tout".

A process of causing the turning track ratio calculating unit 54h to calculate the turning track ratio at the time of turning will be described below. In this embodiment, the turning track ratio is calculated using Expression (3).

Turning track ratio=(π×turning radius of turning wheel 24L)/(π×turning radius of turning wheel 24R)=vehicle velocity of turning wheel 24L side/vehicle velocity of turning wheel 24R side=rotation speed of turning wheel 24L/rotation speed of turning wheel 24R    (3)

The vehicle velocity of the turning wheel 24L side is calculated from the length of the inner track Tin per unit time and the vehicle velocity of the turning wheel 24R is calculated from the length of the outer track Tout per unit time. In this case, for example, when the distance DL and the distance DR are set to 0.75 m, the average turning radius R is set to 5 m, and these values are substituted for Expression (3), the turning track ratio is equal to the value expressed by Expression (4).

$$\text{Turning track ratio} = \{\pi \times (5 + 0.75)\}/\{\pi \times (5 - 0.75)\} \quad (4)$$
$$= Vo/Vi$$
$$= (No \times r)/(Ni \times r)$$
$$= 1.35$$

Vo represents the vehicle velocity of the turning wheel 24L side (i.e., outside in the vehicle width direction of the vehicle), and Vi represents the vehicle velocity of the turning wheel 24R (i.e., inside in the vehicle width direction of the vehicle). No represents the rotation speed of the turning wheel 24L, Ni represents the rotation speed of the turning wheel 24R, and r represents the dynamic radius of the turning wheel 24.

The process of causing the vehicle-turning rotation angle detecting unit 54g to determine that the deviation between the set track ratio and the turning track ratio is greater than the deviation threshold value and to detect the vehicle-turning rotation angle will be described below.

When the turning track ratio calculating unit 54h calculates the turning track ratio, the vehicle-turning rotation angle detecting unit 54g calculates the deviation between the turning track ratio calculated by the turning track ratio calculating unit 54h and the set track ratio. When it is determined that the calculated deviation is greater than the deviation threshold value, the vehicle-turning rotation angle is detected.

In this embodiment, for example, it is assumed that the deviation threshold value is set to 3%. The deviation threshold value (e.g., 3%) is stored in the vehicle-turning rotation angle detecting unit 54g beforehand. As can be seen from Expression (4), in the state where the distance DL and the distance DR are 0.75 m and the average turning radius R is 5 m, the turning track ratio is 1.35. When the average turning radius R is, for example, 6 m due to time degradation or the like, the turning track ratio is 1.29. When the average turning radius R is set to 5 m and the set track ratio is set to 1.35 beforehand at the time of shipping of the vehicle from a factory and the average turning radius R increases to 6 m, the deviation between the turning track ratio and the set track ratio is greater than 4% (i.e., 1.35/1.29).

Therefore, when the turning track ratio in the state where the average turning radius R is 5 m is set as the set track ratio and the average turning radius R increases to 6 m, the vehicle-turning rotation angle detecting unit 54g determines that the deviation between the turning track ratio and the set track ratio is greater than the deviation threshold value (e.g., 3%). The vehicle-turning rotation angle detecting unit 54g having determined that the deviation between the turning track ratio and the set track ratio is greater than the deviation threshold value detects the vehicle-turning rotation angle. For example, when the average turning radius R is changed to a value less than 5 m by maintaining the vehicle in a repair garage or the like and it is determined that the deviation between the turning track ratio and the set track ratio is greater than the deviation threshold value, the vehicle-turning rotation angle detecting unit 54g also detects the vehicle-turning rotation angle.

Figure 8:
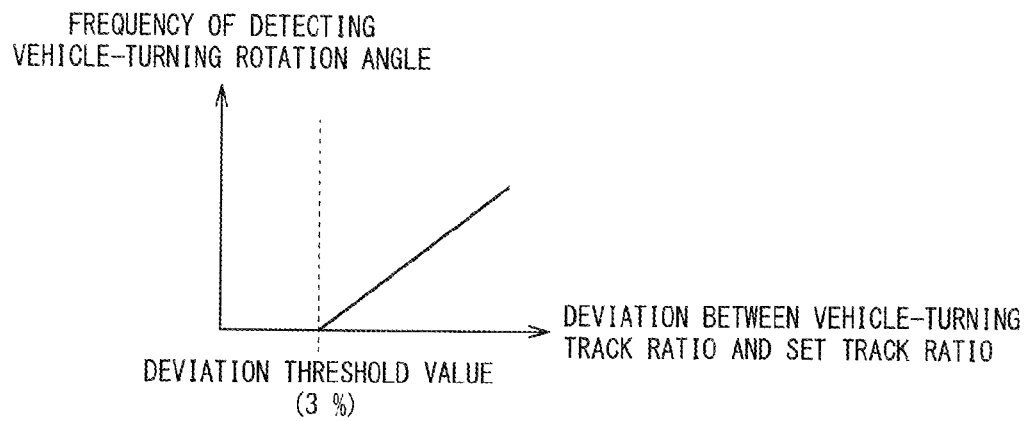
FIG. 8 is a diagram illustrating a relationship between a deviation between a vehicle-turning track ratio and a set track ratio and a frequency of detecting a vehicle-turning rotation angle.

In this embodiment, for example, as illustrated in FIG. 8, when the deviation between the turning track ratio and the set track ratio is greater than 3%, the frequency of detecting the vehicle-turning rotation angle is made to increase as the deviation between the turning track ratio and the set track ratio increases. FIG. 8 is a diagram illustrating a relationship between the deviation between the turning track ratio and the set track ratio and the frequency of detecting the vehicle-turning rotation angle. When detecting the vehicle-turning rotation angle, the rotation angle of the steering motor 2 at the time of turning with the turning angle of the turning wheels 24 as the set rotation angle is detected and the detected rotation angle of the steering motor 2 is set as the vehicle-turning rotation angle.

The process of causing the set rotation angle storage unit 54d to update the set rotation angle depending on an angle obtained by subtracting the deviation between the limit turning angle and the set turning angle from the vehicle-turning rotation angle detected by the vehicle-turning rotation angle detecting unit 54g will be described below. When the vehicle-turning rotation angle detecting unit 54g detects the vehicle-turning rotation angle, the set rotation angle storage unit 54d updates the set rotation angle to the angle obtained by subtracting the deviation between the limit turning angle and the set turning angle from the vehicle-turning rotation angle detected by the vehicle-turning rotation angle detecting unit 54g. In this embodiment, the set rotation angle storage unit 54d performs the following process when updating the set rotation angle to the angle obtained by subtracting the deviation between the limit turning angle and the set turning angle from the vehicle-turning rotation angle.

In this embodiment, the limit turning angle is set to 500 degrees and the set turning angle is set to 499 degrees. That is, in this embodiment, the deviation between the limit turning angle and the set turning angle is 1 degree. Therefore, when the set rotation angle storage unit 54d updates the set rotation angle to the angle obtained by subtracting the deviation between the limit turning angle and the set turning angle from the vehicle-turning rotation angle, the process of updating the set rotation angle to the angle obtained by subtracting 1 degree from the vehicle-turning rotation angle is performed.

An example of the operation of the steering control apparatus 1 according to this embodiment will be described below with reference to FIGS. 1 to 8. When the steering control apparatus 1 is activated, the current supply quantity limiting unit 54e limits the supply quantity of the steering motor drive current so that the rotation angle of the steering motor 2 detected by the steering motor angle sensor 16 is not greater than the set rotation angle (e.g., 499 degrees) even when the driver performs the full wheel steering.

When the vehicle turns, the turning track ratio calculating unit 54h calculates the turning track ratio. The vehicle-turning rotation angle detecting unit 54g detects the vehicle-turning rotation angle when it is determined that the deviation between the turning track ratio calculated by the turning track ratio calculating unit 54h and the set track ratio is greater than the deviation threshold value.

When the vehicle-turning rotation angle detecting unit 54g detects the vehicle-turning rotation angle, the set rotation angle storage unit 54d compares the detected vehicle-turning rotation angle with the set rotation angle. When it is determined that the set rotation angle is different from the vehicle-turning rotation angle detected by the vehicle-turning rotation angle detecting unit 54g, the set rotation angle storage unit 54d updates the set rotation angle to the angle obtained by subtracting the deviation between the limit turning angle and the set turning angle from the vehicle-turning rotation angle.

When the limit state is detected in the state where the rotation angle of the steering motor 2 is equal to or less than the set rotation angle, the set rotation angle storage unit 54d updates the set rotation angle depending on the rotation angle of the steering motor 2 at that time. Accordingly, in the steering control apparatus 1 according to this embodiment, even when the driver performs the full wheel steering at the time of driving or stopping the vehicle, it is possible to suppress contact between the rack end and the steering rack and thus to suppress supply of the excessive steering motor drive current to the steering motor. In addition, even when the driver performs the full wheel steering at the time of driving or stopping the vehicle, it is possible to suppress an increase in the drive force output from the steering motor 2 and thus to suppress degradation of the steering motor 2.

In the steering control apparatus 1 according to this embodiment, when it is determined that the set rotation angle and the vehicle-turning rotation angle at the time of turning of the vehicle are deviation from each other, the set rotation angle storage unit 54d updates the set rotation angle to the angle obtained by subtracting the deviation between the limit turning angle and the set turning angle from the vehicle-turning rotation angle. Accordingly, even when the positional relationship between the rotation angle of the steering motor 2 detected by the steering motor angle sensor 16 and the rack shaft 18 varies from the relationship at the time of shipping of the vehicle from a factory, it is possible to update the set rotation angle depending on the variation amount.

That is, in the steering control apparatus 1 according to this embodiment, as described above, it is possible to update the set rotation angle with the vehicle-turning rotation angle when the vehicle turns at the turning angle of the turning wheels 24 as the set turning angle while the vehicle is traveling. Accordingly, similarly to the first embodiment, it is possible to suppress an increase in the turning radius of the vehicle or an increase in the drive force output from the steering motor 2.

As described above, in the steering control method of a vehicle which is performed through the operations of the steering control apparatus 1 according to this embodiment, the rotation angle of the steering motor 2 is detected, the steering motor drive current is supplied to the steering motor 2, and the set rotation angle is stored beforehand. Then, the supply quantity of the steering motor drive current is limited so that the detected rotation angle is not greater than the set rotation angle.

In the steering control method according to this embodiment, the vehicle-turning rotation angle is detected and the set rotation angle is updated to the angle obtained by subtracting the deviation between the limit turning angle and the set turning angle from the vehicle-turning rotation angle. In the steering control method according to this embodiment, it is determined whether or not the steering based on the set rotation angle is performed on the basis of the set rotation angle stored beforehand and the detected vehicle-turning rotation angle. Here, when it is determined that the set rotation angle stored beforehand and the detected vehicle-turning rotation angle are different from each other, the process of updating the set rotation angle is performed. In the steering control method according to this embodiment, the turning track ratio is calculated at the time of turning. In addition, when it is determined that the deviation between the calculated turning track ratio and the set track ratio is greater than the deviation threshold value, the process of detecting the vehicle-turning rotation angle is performed.

In the above description, the steering motor angle sensor 16 corresponds to the steering motor angle detecting unit. The steering position servo control unit 30 and the steering motor current command computing unit 54b correspond to the steering motor drive current supply unit. The steering motor angle sensor 16, the steering position servo control unit 30, the steering angle sensor 34, the steering motor current command computing unit 54b, and the set rotation angle storage unit 54d correspond to the steering angle limit state detecting unit that detects the above-mentioned limit state.

Advantageous Effects of the Third Embodiment include the following:

(1) The vehicle-turning rotation angle detecting unit 54g detects the vehicle-turning rotation angle which is the rotation angle of the steering motor 2 when the vehicle turns at the turning angle of the turning wheels 24 as the set turning angle while the vehicle is traveling. In addition, when it is determined that the set rotation angle stored beforehand and the vehicle-turning rotation angle detected by the vehicle-turning rotation angle detecting unit 54g are different from each other, the set rotation angle storage unit 54d updates the set rotation angle depending on the angle obtained by subtracting the deviation between the limit turning angle and the set turning angle from the vehicle-turning rotation angle. Accordingly, it is possible to update the set rotation angle to an angle which can suppress contact between the rack end and the steering rack 14 on the basis of the rotation angle of the steering motor 2 when the vehicle turns at the turning angle of the turning wheels 24 as the set turning angle while the vehicle is traveling. As a result, the set rotation angle at which the positional relationship between the rack end and the steering rack 14 varies due to time degradation or the like can be updated to the angle which can suppress contact between the rack end and the steering rack 14. As a result, even when the driver performs the full wheel steering at the time of driving or stopping the vehicle, it is possible to suppress contact between the rack end and the steering rack 14 and thus to suppress supply of the excessive steering motor drive current to the steering motor 2. In addition, even when the driver performs the full wheel steering at the time of driving or stopping the vehicle, it is possible to suppress an increase in the drive force output from the steering motor 2 and thus to suppress degradation of the steering motor 2.

(2) The turning track ratio calculating unit 54h calculates the turning track ratio when the vehicle turns. In addition, the vehicle-turning rotation angle detecting unit 54g detects the vehicle-turning rotation angle when it is determined that the deviation between the set track ratio set beforehand and the turning track ratio calculated by the turning track ratio calculating unit 54h is greater than the deviation threshold value set beforehand. Accordingly, when the vehicle turns, it is possible to provide an opportunity to detect whether or not the set rotation angle stored beforehand in the set rotation angle storage unit 54d varies from the time point of setting the set rotation angle such as the time of shipping of the vehicle from the factory. As a result, by providing an opportunity to correct the set rotation angle to an appropriate value, it is possible to reduce a possibility that the rack end and the steering rack 14 come in contact with each other when the driver performs the full wheel steering at the time of driving or stopping the vehicle.

In addition, even when the positional relationship between the rack end and the steering rack 14 varies from the state at the time of shipping of the vehicle from the factory due to an increase in the integrated travel distance of the vehicle or a maintenance condition thereof, it is possible to update the set rotation angle depending on the variation amount. Accordingly, it is possible to update the set rotation angle to a value capable of reducing the possibility that the rack end and the steering rack 14 come in contact with each other depending on the variation amount of the positional relationship between the rack end and the steering rack 14 from the state at the time of shipping of the vehicle from the factory. As a result, it is possible to adjust the turning angle of the turning wheels 24 and the positional relationship between the stopper portion 14a and the end contact member 18b and to suppress an increase in the turning radius of the vehicle.

(3) When the limit state is detected in the state where the rotation angle of the steering motor 2 detected by the steering motor angle sensor 16 is equal to the set rotation angle, the set rotation angle storage unit 54d updates the set rotation angle depending on the rotation angle of the steering motor 2 at that time. Accordingly, even when a degree of fastening of a retainer in a repair garage or the like becomes greater than an appropriate value and the looseness occurring in the engagement between the steering output gear 12a and the rack gear 18a decreases less than an appropriate value, it is possible to update the set rotation angle to an appropriate value depending on the degree of decrease. As a result, since it is possible to adjust the turning angle of the turning wheels 24 and the positional relationship between the stopper portion 14a and the end contact member 18b and to suppress an increase in the turning radius of the vehicle, it is possible to suppress an increase in the drive force output from the steering motor 2.

(4) In the steering control method according to this embodiment, the vehicle-turning rotation angle is detected. When it is determined that the set rotation angle stored beforehand and the detected vehicle-turning rotation angle are different from each other, the set rotation angle is updated depending on the angle obtained by subtracting the deviation between the limit turning angle and the set turning angle from the vehicle-turning rotation angle. Accordingly, it is possible to update the set rotation angle to an angle which can suppress contact between the rack end and the steering rack 14 on the basis of the rotation angle of the steering motor 2 when the vehicle turns at the turning angle of the turning wheels 24 as the set turning angle while the vehicle is traveling. As a result, the set rotation angle at which the positional relationship between the rack end and the steering rack 14 varies due to time degradation or the like can be updated to the angle which can suppress contact between the rack end and the steering rack 14. As a result, even when the driver performs the full wheel steering at the time of driving or stopping the vehicle, it is possible to suppress contact between the rack end and the steering rack 14 and thus to suppress supply of the excessive steering motor drive current to the steering motor 2. In addition, even when the driver performs the full wheel steering at the time of driving or stopping the vehicle, it is possible to suppress an increase in the drive force output from the steering motor 2 and thus to suppress degradation of the steering motor 2.

(5) In the steering control method according to this embodiment, the turning track ratio at the time of turning of the vehicle is calculated. In addition, the vehicle-turning rotation angle detecting unit 54g detects the vehicle-turning rotation angle when it is determined that the deviation between the set track ratio set beforehand and the calculated turning track ratio is greater than the deviation threshold value set beforehand. Accordingly, when the vehicle turns, it is possible to provide an opportunity to detect whether or not the set rotation angle stored beforehand varies from the time point of setting the set rotation angle such as the time of shipping of the vehicle from the factory. As a result, by providing an opportunity to correct the set rotation angle to an appropriate value, it is possible to reduce a possibility that the rack end and the steering rack 14 come in contact with each other when the driver performs the full wheel steering at the time of driving or stopping the vehicle.

In addition, even when the positional relationship between the rack end and the steering rack 14 varies from the state at the time of shipping of the vehicle from the factory due to an increase in the integrated travel distance of the vehicle or a maintenance condition thereof, it is possible to update the set rotation angle depending on the variation amount. Accordingly, it is possible to update the set rotation angle to a value capable of reducing the possibility that the rack end and the steering rack 14 come in contact with each other depending on the variation amount of the positional relationship between the rack end and the steering rack 14 from the state at the time of shipping of the vehicle from the factory. As a result, it is possible to adjust the turning angle of the turning wheels 24 and the positional relationship between the stopper portion 14a and the end contact member 18b and to suppress an increase in the turning radius of the vehicle.

A fourth embodiment of the present invention (hereinafter, referred to as "this embodiment") will be described below with reference to the accompanying drawings. Descriptions of the same elements as those in the first embodiment are omitted in some cases.

The steering control apparatus 1 according to this embodiment has the same configuration as the first embodiment except for the configuration of the command computing unit 54, and thus description of the other configuration may not be repeated.

Figure 9:
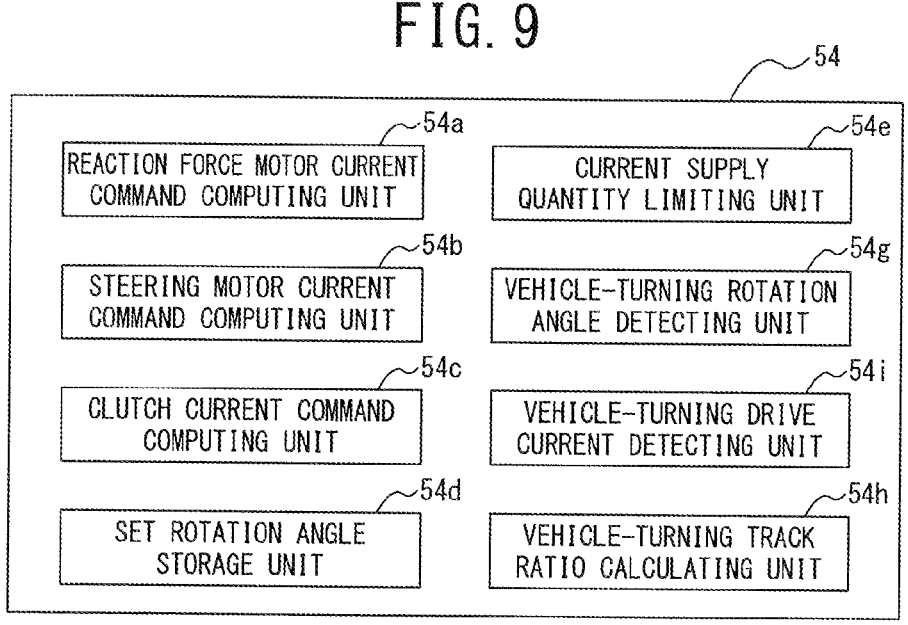
FIG. 9 is a block diagram illustrating a detailed configuration of the command computing unit according to a fourth embodiment of the present invention.

The detailed configuration of the command computing unit 54 will be described below with reference to FIGS. 1 to 8 through the use of FIGS. 9 to 13. FIG. 9 is a block diagram illustrating the detailed configuration of the command computing unit 54. As illustrated in FIG. 9, the command computing unit 54 includes a reaction force motor current command computing unit 54a, a steering motor current command computing unit 54b, and a clutch current command computing unit 54c. In addition, the command computing unit 54 further includes a set rotation angle storage unit 54d, a current supply quantity limiting unit 54e, and a vehicle-turning rotation angle detecting unit 54g, and a turning track ratio calculating unit 54h.

The configurations of the reaction force motor current command computing unit 54a, the steering motor current command computing unit 54*b*, the clutch current command computing unit 54*c*, the set rotation angle storage unit 54*d*, and the vehicle-turning rotation angle detecting unit 54*g* are the same as in the first embodiment and description thereof will not be repeated. The current supply quantity limiting unit 54*e* limits the supply quantity of the steering motor drive current so that the rotation angle of the steering motor 2 detected by the steering motor angle sensor 16 is not greater than the set rotation angle stored beforehand in the set rotation angle storage unit 54*d*.

Specifically, with reference to the rotation angle of the steering motor 2 detected by the steering motor angle sensor 16, a command signal for decreasing the steering motor drive current so that the referred rotation angle is not greater than the set rotation angle is output to the steering motor current command computing unit 54*b*. Here, when generating the command signal for decreasing the steering motor drive current so that the rotation angle of the steering motor 2 detected by the steering motor angle sensor 16 is not greater than the set rotation angle, for example, the same process as in the first embodiment is performed.

With respect to a state where the turning wheels 24 and the steering wheel 32 are located at the neutral position, the current supply quantity limiting unit 54*e* generates a command signal for increasing a reaction force as the turning angle of the turning wheels 24 becomes to 499 degrees and outputs the generated command signal to the reaction force servo control unit 56. When the set rotation angle storage unit 54*d* updates the set rotation angle, the command signal for increasing the reaction force is also generated on the basis of the updated set rotation angle.

When it is determined that a turning supply quantity detected by a vehicle-turning drive current detecting unit 54*i* is greater than the limited supply quantity of the steering motor drive current, the current supply quantity limiting unit 54*e* relaxes the limit on the supply quantity of the steering motor drive current. Accordingly, the supply quantity of the steering motor drive current to the steering motor 2 is made to increase and the range in which the turning wheels 24 can be steered is set to a range corresponding to the angle greater than the set rotation angle stored beforehand in the set rotation angle storage unit 54*d*.

In this embodiment, for example, it is assumed that the current supply quantity limiting unit 54*e* sets a relaxation degree by which the limit on the supply quantity of the steering motor drive current is relaxed on the basis of one coefficient with a maximum value out of three coefficients to be described below. In this case, the current supply quantity limiting unit 54*e* selects the coefficient with the maximum value out of three coefficients with reference to three coefficients (i.e., an integrated travel distance coefficient, a limit angle attainment time coefficient, and a turning track ratio coefficient).

Integrated Travel Distance Coefficient

When the integrated travel distance of the vehicle is greater than a predetermined travel distance threshold value, the integrated travel distance coefficient is a coefficient which increases as the travel distance exceeding the travel distance threshold value is integrated. For example, a distance measured by a distance meter (i.e., odometer) which is an existing element in a general vehicle is used as the integrated travel distance of the vehicle.

Figure 10:
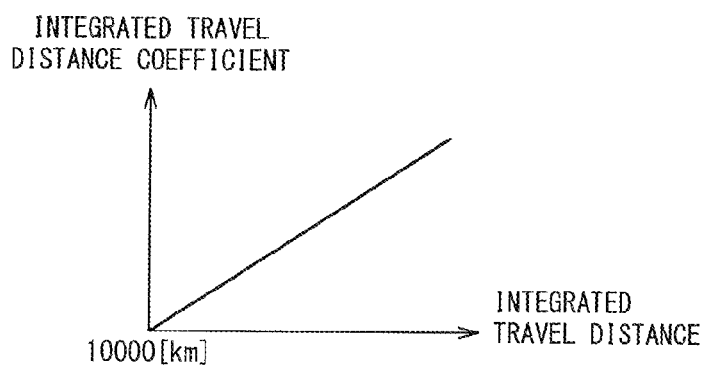
FIG. 10 is a diagram illustrating a relationship between an integrated travel distance coefficient and an integrated travel distance of the vehicle.

In this embodiment, for example, it is assumed that the travel distance threshold value is 10000 km. Therefore, the integrated travel distance coefficient is a coefficient which increases as the travel distance is integrated after the integrated travel distance exceeds 10000 km, as illustrated in FIG. 10. FIG. 10 is a diagram illustrating a relationship between the integrated travel distance coefficient and the integrated travel distance of the vehicle.

Limit Angle Attainment Time Coefficient

The limit angle attainment time coefficient is a coefficient which increases as the limit angle attainment time which is a time in which the turning angle of the turning wheels 24 is equal to the limit turning angle increases. When the time in which the actual steering motor current (i.e., q-axis current) is equal to an excessive current value unnecessary for normal steering reaches a predetermined time, the limit angle attainment time is detected on the basis of the time reaching the predetermined time.

Figure 11:
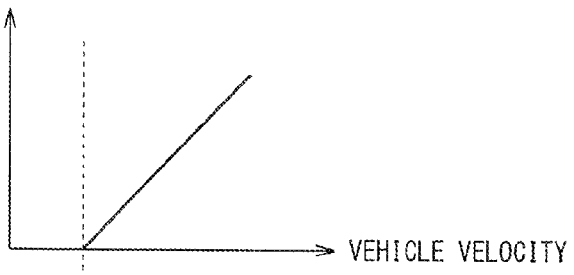
FIG. 11 is a diagram illustrating a relationship between a limit angle attainment time coefficient and the velocity of the vehicle.

In this embodiment, the limit angle attainment time coefficient is set to "0" in a state where the vehicle velocity of the vehicle does not reach a speed (e.g., 5 km/h) at which the vehicle can be considered to be traveling. Therefore, as illustrated in FIG. 11, the limit angle attainment time coefficient is a coefficient which increases as the vehicle velocity increases in the state where the vehicle velocity is equal to or higher than 5 km/h. FIG. 11 is a diagram illustrating a relationship between the limit angle attainment time coefficient and the vehicle velocity of the vehicle.

Turning Track Ratio Coefficient

The turning track ratio coefficient is a coefficient which increases as the deviation exceeding the deviation threshold value increases when the track ratio deviation which is the deviation between the set track ratio set beforehand and the turning track ratio calculated by the turning track ratio calculating unit 54*h* is greater than a predetermined deviation threshold value. The set track ratio is a designed value of the vehicle, is set at the time of designing, manufacturing, and shipping of a vehicle, and is stored in the vehicle-turning rotation angle detecting unit 54*g*. The process of detecting the track ratio deviation will be described later.

Figure 12:
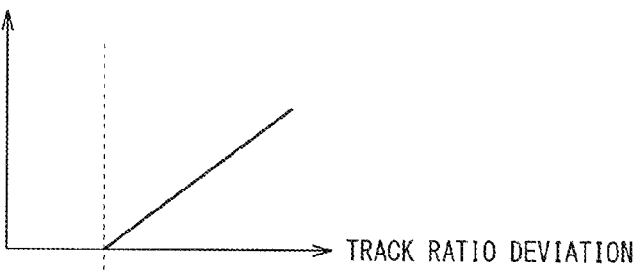
FIG. 12 is a diagram illustrating a relationship between a vehicle-turning track ratio coefficient and a track ratio deviation.

In this embodiment, for example, it is assumed that the deviation threshold value is set to 3%. The deviation threshold value (e.g., 3%) is stored in the vehicle-turning rotation angle detecting unit 54*g* beforehand. Accordingly, as illustrated in FIG. 12, the turning track ratio coefficient is a coefficient which increases as the track ratio deviation increases in a state where the track ratio deviation is greater than 3%. FIG. 12 is a diagram illustrating a relationship between the turning track ratio coefficient and the track ration deviation.

When the coefficient with the maximum value out of the integrated travel distance coefficient, the limit angle attainment time coefficient, and the turning track ratio coefficient is selected, the current supply quantity limiting unit 54*e* sets a relaxation degree by which the limit on the supply quantity of the steering motor drive current is relaxed on the basis of one selected coefficient.

Figure 13:
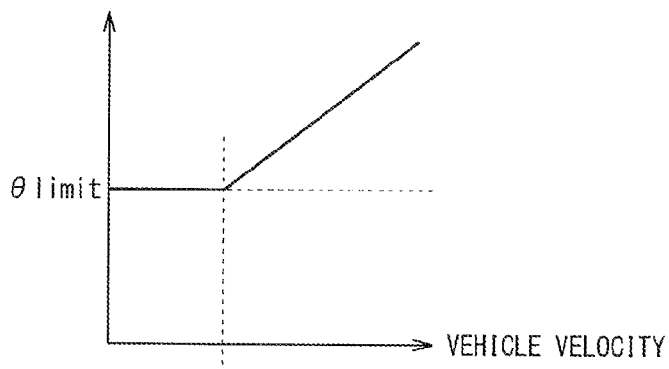
FIG. 13 is a diagram illustrating a relationship between a vehicle velocity and a turning angle that is steerable.

When the current supply quantity limiting unit 54*e* sets the relaxation degree, the supply quantity of the steering motor drive current is limited so that the rotation angle of the steering motor 2 is not greater than the set rotation angle in the state where the vehicle velocity of the vehicle does not reach the speed at which the vehicle can be considered to be traveling as illustrated in FIG. 13. The process of causing the current supply quantity limiting unit 54*e* to set the relaxation degree, similarly to the limit angle attainment time coefficient, the speed at which the vehicle can be considered to be traveling is set to 5 km/h. FIG. 13 is a diagram illustrating a relationship between the vehicle velocity and the turning angle that is steerable. In FIG. 13, the set rotation angle is marked by "θlimit".

This is because there is a possibility that the turning wheels 24 come in contact with a curbstone or the like or a possibility that the turning wheel is stuck (or falls) into a side ditch (i.e., trench) and thus there is a possibility that the turning angle of the turning wheels 24 does not actually reach the limit.

On the other hand, when the vehicle velocity is equal to or higher than the speed at which the vehicle can be considered to be traveling, the relaxation degree by which the limit on the supply quantity of the steering motor drive current is relaxed is made to continuously increase with the degree of increase of the selected coefficient as the vehicle velocity increases. Accordingly, the range in which the turning wheels 24 can be steered is set to the range corresponding to the angle greater than the set rotation angle stored beforehand in the set rotation angle storage unit 54*d* and the turning angle that is steerable is made to increase.

As illustrated in FIG. 13, the reason of continuously increasing the relaxation degree as the vehicle velocity increases is that there is a possibility that the relaxation degree rapidly varies and the turning angle of the turning wheels 24 rapidly varies when the relaxation degree intermittently varies. The vehicle-turning drive current detecting unit 54*i* detects the turning supply quantity. The turning supply quantity is a supply quantity of the steering motor drive current to the steering motor 2 in the state where the turning angle of the turning wheels 24 is equal to the set turning angle while the vehicle is traveling, and is detected, for example, on the basis of the steering motor current command It input to the command computing unit 54.

The turning track ratio calculating unit 54*h* calculates the turning track ratio in the turning state which is a state in which the turning angle of the turning wheels 24 is equal to the set turning angle while the vehicle is traveling. Here, the turning track ratio is a track ratio of an inner track which is a track of an inner turning wheel rotating inside in the vehicle width direction of the vehicle at the time of turning and an outer track which is a track of an outer turning wheel rotating outside in the vehicle width direction of the vehicle at the time of turning. That is, the turning wheels 24 includes the inner turning wheel rotating inside in the vehicle width direction of the vehicle at the time of turning and the outer turning wheel rotating outside in the vehicle width direction of the vehicle at the time of turning (see FIG. 7).

The process of causing the turning track ratio calculating unit 54*h* to calculate the turning track ratio at the time of turning is the same as described in the third embodiment and thus description thereof will not be repeated. The process of causing the set rotation angle storage unit 54*d* to update the set rotation angle to the angle obtained by subtracting the deviation between the limit turning angle and the set turning angle from the vehicle-turning rotation angle detected by the vehicle-turning rotation angle detecting unit 54*g* is the same as described in the third embodiment and thus description thereof will not be repeated.

An example of the operation which is performed by the steering control apparatus 1 according to this embodiment will be described below with reference to FIGS. 1 to 13. When the steering control apparatus 1 is activated, the current supply quantity limiting unit 54*e* limits the supply quantity of the steering motor drive current so that the rotation angle of the steering motor 2 detected by the steering motor angle sensor 16 is not greater than the set rotation angle (e.g., 499 degrees) even when the driver performs the full wheel steering. At the time of turning of the vehicle, the turning track ratio calculating unit 54*h* calculates the turning track ratio and the vehicle-turning rotation angle detecting unit 54*g* detects the vehicle-turning rotation angle. In addition, at the time of turning of the vehicle, the vehicle-turning drive current detecting unit 54*i* detects the turning supply quantity.

When the vehicle-turning drive current detecting unit 54*i* detects the turning supply quantity, the set rotation angle storage unit 54*d* compares the detected turning supply quantity with the supply quantity of the steering motor drive current limited by the current supply quantity limiting unit 54*e*. When it is determined that the turning supply quantity is greater than the supply quantity of the steering motor drive current limited by the current supply quantity limiting unit 54*e*, the set rotation angle storage unit 54*d* updates the set rotation angle to the angle obtained by subtracting the deviation between the limit turning angle and the set turning angle from the vehicle-turning rotation angle.

When it is detected the turning wheels 24 are in the steerable limit state where the rotation angle of the steering motor 2 is equal to or less than the set rotation angle, the set rotation angle storage unit 54*d* updates the set rotation angle depending on the rotation angle of the steering motor 2 at that time. Accordingly, in the steering control apparatus 1 according to this embodiment, even when the driver performs the full wheel steering at the time of driving or stopping the vehicle, it is possible to suppress contact between the rack end and the steering rack and thus to suppress supply of the excessive steering motor drive current to the steering motor. In addition, even when the driver performs the full wheel steering at the time of driving or stopping the vehicle, it is possible to suppress an increase in the drive force output from the steering motor 2 and thus to suppress degradation of the steering motor 2.

In the steering control apparatus 1 according to this embodiment, at the time of turning of the vehicle, the set rotation angle storage unit 54*d* updates the set rotation angle to the angle obtained by subtracting the deviation between the limit turning angle and the set turning angle from the vehicle-turning rotation angle. Accordingly, even when the positional relationship between the rotation angle of the steering motor 2 detected by the steering motor angle sensor 16 and the rack shaft 18 varies from the state at the time of shipping of the vehicle from a factory, it is possible to update the set rotation angle depending on the variation amount.

That is, in the steering control apparatus 1 according to this embodiment, as described above, the set rotation angle can be updated on the basis of the steering motor drive current supplied to the steering motor 2 at the time of turning of the vehicle. Accordingly, similarly to the first embodiment, it is possible to suppress an increase in the turning radius of the vehicle or an increase in the drive force output from the steering motor 2.

As described above, in the steering control method of a vehicle which is performed through the operation of the steering control apparatus 1 according to this embodiment, the rotation angle of the steering motor 2 is detected and the steering motor drive current is supplied to the steering motor 2. In addition, in the steering control method, the set rotation angle is stored beforehand and the supply quantity of the steering motor drive current is limited so that the detected rotation angle is not greater than the set rotation angle.

In the steering control method according to this embodiment, the vehicle-turning rotation angle is detected, the vehicle-turning supply quantity is detected, and it is determined whether or not the detected vehicle-turning supply quantity is greater than the limited supply quantity of the steering motor drive current. In the steering control method according to this embodiment, when it is determined that the detected vehicle-turning supply quantity is greater than the limited supply quantity of the steering motor drive current, the process of updating the set rotation angle is performed.

In the above description, the steering motor angle sensor 16 corresponds to the steering motor angle detecting unit. The steering position servo control unit 30 and the steering motor current command computing unit 54*b* correspond to the steering motor drive current supply unit. The steering motor angle sensor 16, the steering position servo control unit 30, the steering angle sensor 34, the steering motor current command computing unit 54*b*, and the set rotation angle storage unit 54*d* correspond to the turning angle limit state detecting unit that detects the above-mentioned limit state.

Advantageous Effects of the Fourth Embodiment including the following:

(1) The vehicle-turning rotation angle detecting unit 54*g* detects the vehicle-turning rotation angle and the vehicle-turning drive current detecting unit 54*i* detects the vehicle-turning supply quantity. In addition, the set rotation angle storage unit 54*d* updates the set rotation angle to the angle obtained by subtracting the deviation between the limit turning angle and the set turning angle from the vehicle-turning rotation angle, when it is determined that the detected vehicle-turning supply quantity is greater than the supply quantity of the steering motor drive current limited by the current supply quantity limiting unit 54*e*. Accordingly, it is possible to update the set rotation angle to an angle which can suppress contact between the rack end and the steering rack 14 on the basis of the steering motor drive current supplied to the steering motor 2 at the time of turning of the vehicle. As a result, the set rotation angle at which the positional relationship between the rack end and the steering rack 14 varies due to time degradation or the like can be updated to the angle which can suppress contact between the rack end and the steering rack 14. As a result, even when the driver performs the full wheel steering at the time of driving or stopping the vehicle, it is possible to suppress contact between the rack end and the steering rack 14 and thus to suppress supply of the excessive steering motor drive current to the steering motor 2. In addition, even when the driver performs the full wheel steering at the time of driving or stopping the vehicle, it is possible to suppress an increase in the drive force output from the steering motor 2 and thus to suppress degradation of the steering motor 2.

(2) When it is detected that the turning wheels 24 are in the steerable limit state where the rotation angle of the steering motor 2 detected by the steering motor angle sensor 16 is equal to or less than the set rotation angle, the set rotation angle storage unit 54*d* updates the set rotation angle depending on the rotation angle of the steering motor 2 at that time. Accordingly, even when a degree of fastening of a retainer in a repair garage or the like becomes greater than an appropriate value and the looseness occurring in the engagement between the steering output gear 12*a* and the rack gear 18*a* decreases less than an appropriate value, it is possible to update the set rotation angle to an appropriate value depending on the degree of decrease. As a result, since it is possible to adjust the turning angle of the turning wheels 24 and the positional relationship between the stopper portion 14*a* and the end contact member 18*b* and to suppress an increase in the turning radius of the vehicle, it is possible to suppress an increase in the drive force output from the steering motor 2.

(3) In the steering control method according to this embodiment, the vehicle-turning rotation angle is detected and the vehicle-turning supply quantity is detected. When it is determined that the detected vehicle-turning supply quantity is greater than the limited supply quantity of the steering motor drive current, the set rotation angle is updated to the angle obtained by subtracting the deviation between the limit turning angle and the set turning angle from the vehicle-turning rotation angle. Accordingly, it is possible to update the set rotation angle to an angle which can suppress contact between the rack end and the steering rack 14 on the basis of the steering motor drive current supplied to the steering motor 2 at the time of turning of the vehicle. As a result, the set rotation angle at which the positional relationship between the rack end and the steering rack 14 varies due to time degradation or the like can be updated to the angle which can suppress contact between the rack end and the steering rack 14. [0169] As a result, even when the driver performs the full wheel steering at the time of driving or stopping the vehicle, it is possible to suppress contact between the rack end and the steering rack 14 and thus to suppress supply of the excessive steering motor drive current to the steering motor 2. In addition, even when the driver performs the full wheel steering at the time of driving or stopping the vehicle, it is possible to suppress an increase in the drive force output from the steering motor 2 and thus to suppress degradation of the steering motor 2.

While the present invention is described with reference to a defined number of embodiments, it will be obvious to those skilled in the art that the scope is not limited to the embodiments and the embodiments can be modified in various forms on the basis of the above description.

The invention claimed is:

1. A steering control apparatus of a vehicle comprising:
    a steering motor configured to output a steering torque for steering a turning wheel;
    a steering motor angle detecting unit configured to detect a rotation angle of the steering motor;
    a steering motor drive current supply unit configured to supply the steering motor with a steering motor drive current for setting a turning angle of the turning wheel to an angle corresponding to an operation of a steering wheel;
    a set rotation angle storage unit configured to store beforehand a set rotation angle which is the rotation angle of the steering motor and which corresponds to the set turning angle that is set to an angle smaller than a limit turning angle to which the turning wheel is steerable; and
    a current supply quantity limiting unit configured to limit a supply quantity of the steering motor drive current not to make the rotation angle detected by the steering motor angle detecting unit greater than the set rotation angle stored beforehand in the set rotation angle storage unit,
    wherein the current supply quantity limiting unit releases a limit on the supply quantity of the steering motor drive current when determining that a predetermined permission condition is satisfied,
    wherein the rotation angle of the steering motor is calculated when the turning wheel is steered up to the limit turning angle that is steerable in a state where the current supply quantity limiting unit releases the limit on the supply quantity of the steering motor drive current, and
    wherein the set rotation angle is updated depending on a deviation between the calculated rotation angle of the steering motor and the set turning angle.

2. The steering control apparatus of a vehicle according to claim 1, wherein the permission condition is set to a condition in which an integrated travel distance of the vehicle is greater than a predetermined travel distance threshold value.

3. The steering control apparatus of the vehicle according to claim 1, wherein the permission condition is set to a condition on which a limit angle attainment time while the turning angle is the limit turning angle is greater than a predetermined attainment time threshold value.

4. The steering control apparatus of the vehicle according to claim 3, wherein the attainment time threshold value is corrected to decrease, as at least one of a vehicle velocity of the vehicle and a steering force applied to the steering wheel increases.

5. The steering control apparatus of the vehicle according to claim 1, wherein the set rotation angle storage unit updates the set rotation angle depending on the rotation angle of the steering motor when the steering motor angle detecting unit detects that the rotation angle is equal to or less than the set rotation angle and the turning wheel is detected to be in a steerable limit state.

6. A steering control apparatus of a vehicle comprising:
a steering motor configured to output a steering torque for steering a turning wheel;
a steering motor angle detecting unit configured to detect a rotation angle of the steering motor;
a steering motor drive current supply unit configured to supply the steering motor with a steering motor drive current for setting a turning angle of the turning wheel to an angle corresponding to an operation of a steering wheel;
a set rotation angle storage unit configured to store beforehand a set rotation angle which is the rotation angle of the steering motor and which corresponds to the set turning angle that is set to an angle smaller than a limit turning angle to which the turning wheel is steerable;
a current supply quantity limiting unit configured to limit a supply quantity of the steering motor drive current not to make the rotation angle detected by the steering motor angle detecting unit greater than the set rotation angle stored beforehand in the set rotation angle storage unit; and
a vehicle-turning rotation angle detecting unit configured to detect a vehicle-turning rotation angle which is the rotation angle of the steering motor when the vehicle turns at the turning angle that is set as the set turning angle while the vehicle is traveling,
wherein the set rotation angle storage unit determines whether or not the turning wheel is steered to correspond to the set rotation angle from the set rotation angle stored beforehand and the vehicle-turning rotation angle detected by the vehicle-turning rotation angle detecting unit.

7. The steering control apparatus of the vehicle according to claim 6, wherein the set rotation angle is updated based on an angle obtained by subtracting a deviation between the limit turning angle and the set turning angle from the vehicle-turning rotation angle detected by the vehicle-turning rotation angle detecting unit.

8. The steering control apparatus of the vehicle according to claim 6, wherein the turning wheel includes an inner turning wheel rotating inside in a vehicle width direction of the vehicle at the time of turning of the vehicle and an outer turning wheel rotating outside in the vehicle width direction of the vehicle at the time of turning of the vehicle,
wherein the steering control apparatus further comprises a vehicle-turning track ratio calculating unit configured to calculate a vehicle-turning track ratio which is a track ratio of an inner track of the inner turning wheel and an outer track of the outer turning wheel, and
wherein the vehicle-turning rotation angle detecting unit detects the vehicle-turning rotation angle when it is determined that a deviation between a predetermined set track ratio and the vehicle-turning track ratio calculated by the vehicle-turning track ratio calculating unit is greater than a predetermined deviation threshold value.

9. The steering control apparatus of the vehicle according to claim 6, wherein the set rotation angle storage unit updates the set rotation angle depending on the rotation angle of the steering motor when it is determined that the turning wheel is in a steerable limit state where the rotation angle detected by the steering motor angle detecting unit is equal to or less than the set rotation angle.

10. A steering control apparatus of a vehicle comprising:
a steering motor configured to output a steering torque for steering a turning wheel;
a steering motor angle detecting unit configured to detect a rotation angle of the steering motor;
a steering motor drive current supply unit configured to supply the steering motor with a steering motor drive current for setting a turning angle of the turning wheel to an angle corresponding to an operation of a steering wheel;
a set rotation angle storage unit configured to store beforehand a set rotation angle which is the rotation angle of the steering motor and which corresponds to the set turning angle that is set to an angle smaller than a limit turning angle to which the turning wheel is steerable;
a current supply quantity limiting unit configured to limit a supply quantity of the steering motor drive current not to make the rotation angle detected by the steering motor angle detecting unit greater than the set rotation angle stored beforehand in the set rotation angle storage unit;
a vehicle-turning rotation angle detecting unit configured to detect a vehicle-turning rotation angle which is the rotation angle of the steering motor in a state where the turning angle is the set turning angle while the vehicle is traveling; and
a vehicle-turning drive current detecting unit configured to detect a vehicle-turning supply quantity which is a supply quantity of the steering motor drive current to the steering motor in a state where the turning angle is the set turning angle while the vehicle is traveling,
wherein the set rotation angle storage unit includes determination means for determining whether or not the vehicle-turning supply quantity detected by the vehicle-turning drive current detecting unit is greater than the supply quantity of the steering motor drive current limited by the current supply quantity limiting unit.

11. The steering control apparatus of the vehicle according to claim 10, wherein the set rotation angle is updated based on an angle obtained by subtracting a deviation between the limit turning angle and the set turning angle from the vehicle-turning rotation angle detected by the vehicle-turning rotation angle detecting unit.

12. The steering control apparatus of the vehicle according to claim 10, wherein the set rotation angle storage unit updates the set rotation angle depending on the rotation angle of the steering motor when it is detected that the turning wheel is in a steerable limit state where the rotation angle detected by the steering motor angle detecting unit is equal to or less than the set rotation angle.

13. A steering control method of a vehicle comprising:
detecting a rotation angle of a steering motor configured to output a steering torque for steering a turning wheel;
supplying the steering motor with a steering motor drive current for setting a turning angle of the turning wheel to an angle corresponding to an operation of a steering wheel;
storing beforehand a set rotation angle which is the rotation angle of the steering motor and which corresponds to the set turning angle that is set to an angle smaller than a limit turning angle to which the turning wheel is steerable;

limiting a supply quantity of the steering motor drive current not to make the detected rotation angle greater than the stored set rotation angle;

detecting a vehicle-turning rotation angle which is the rotation angle of the steering motor when the vehicle turns at the turning angle that is set as the set turning angle while the vehicle is traveling;

determining whether or not the turning wheel is steered to correspond to the set rotation angle from the set rotation angle stored beforehand and the detected vehicle-turning rotation angle.

14. The steering control method of the vehicle according to claim 13, wherein the set rotation angle is updated based on an angle obtained by subtracting a deviation between the limit turning angle and the set turning angle from the vehicle-turning rotation angle.

15. The steering control method of the vehicle according to claim 13, wherein the turning wheel includes an inner turning wheel rotating inside in a vehicle width direction of the vehicle at the time of turning of the vehicle and an outer turning wheel rotating outside in the vehicle width direction of the vehicle at the time of turning of the vehicle, wherein a vehicle-turning track ratio is calculated which is a track ratio of an inner track of the inner turning wheel and an outer track of the outer turning wheel at the time of turning of the vehicle, and wherein the vehicle-turning rotation angle is detected when it is determined that a deviation between a predetermined set track ratio and the calculated vehicle-turning track ratio is greater than a predetermined deviation threshold value.

16. A steering control method of a vehicle comprising:

detecting a rotation angle of a steering motor configured to output a steering torque for steering a turning wheel;

supplying the steering motor with a steering motor drive current for setting a turning angle of the turning wheel to an angle corresponding to an operation of a steering wheel;

storing beforehand a set rotation angle which is the rotation angle of the steering motor and which corresponds to the set turning angle that is set to an angle smaller than a limit turning angle to which the turning wheel is steerable;

limiting a supply quantity of the steering motor drive current not to make the detected rotation angle greater than the stored set rotation angle;

detecting a vehicle-turning rotation angle which is the rotation angle of the steering motor in a state where the turning angle is the set turning angle while the vehicle is traveling;

detecting a vehicle-turning supply quantity which is a supply quantity of the steering motor drive current to the steering motor in a state where the turning angle is the set turning angle while the vehicle is traveling; and determining whether or not the detected vehicle-turning supply quantity is greater than the limited supply quantity of the steering motor drive current.

17. The steering control method of the vehicle according to claim 16, wherein the set rotation angle is updated based on an angle obtained by subtracting a deviation between the limit turning angle and the set turning angle from the detected vehicle-turning rotation angle.

18. A steering control apparatus of a vehicle comprising:

a steering motor for outputting a steering torque for steering a turning wheel;

a steering motor angle detecting means for detecting a rotation angle of the steering motor;

a steering motor drive current supply means for supplying the steering motor with a steering motor drive current for setting a turning angle of the turning wheel to an angle corresponding to an operation of a steering wheel;

a set rotation angle storage means for storing beforehand a set rotation angle which is the rotation angle of the steering motor and which corresponds to the set turning angle that is set to an angle smaller than a limit turning angle to which the turning wheel is steerable; and a current supply quantity limiting means for limiting a supply quantity of the steering motor drive current not to make the rotation angle detected by the steering motor angle detecting means greater than the set rotation angle stored beforehand in the set rotation angle storage means, wherein the current supply quantity limiting means releases a limit on the supply quantity of the steering motor drive current when determining that a predetermined permission condition is satisfied, wherein the rotation angle of the steering motor is calculated when the turning wheel is steered up to the limit turning angle that is steerable in a state where the current supply quantity limiting means releases the limit on the supply quantity of the steering motor drive current, and wherein the set rotation angle is updated depending on a deviation between the calculated rotation angle of the steering motor and the set turning angle.

* * * * *